(12) United States Patent
Buzzoni et al.

(10) Patent No.: US 8,306,649 B2
(45) Date of Patent: Nov. 6, 2012

(54) SYSTEM AND PROCESS FOR IMPROVING CONTAINER FLOW IN A PORT FACILITY

(75) Inventors: Guy Alan Buzzoni, Portsmouth, VA (US); Richard L. Hudson, Mount Pleasant, SC (US); Edward McCarthy, Chesapeake, VA (US); Peter Giugliano, Suffolk, VA (US)

(73) Assignee: APM Terminals North America, Inc., Portsmouth, VA (US)

( * ) Notice: Subject to any disclaimer, the term of this patent is extended or adjusted under 35 U.S.C. 154(b) by 0 days.

(21) Appl. No.: 13/165,003

(22) Filed: Jun. 21, 2011

(65) Prior Publication Data

US 2011/0251716 A1   Oct. 13, 2011

Related U.S. Application Data

(63) Continuation of application No. 11/359,438, filed on Feb. 23, 2006, now Pat. No. 7,987,017.

(60) Provisional application No. 60/655,876, filed on Feb. 25, 2005.

(51) Int. Cl.
*G06F 7/00* (2006.01)
*B63B 27/00* (2006.01)
*B63B 35/00* (2006.01)
*B65G 67/50* (2006.01)

(52) U.S. Cl. .......................... 700/213; 414/803

(58) Field of Classification Search .................. 700/213, 700/214, 259; 414/803, 137.1, 139.4, 140.3, 414/141.3
See application file for complete search history.

(56) References Cited

U.S. PATENT DOCUMENTS

| | | | |
|---|---|---|---|
| 3,543,952 | A | 12/1970 | Young |
| 3,550,796 | A | 12/1970 | Walda |
| 3,559,822 | A | 2/1971 | Lichtenford et al. |
| 3,669,206 | A | 6/1972 | Tax et al. |
| 3,700,128 | A | 10/1972 | Noble et al. |
| 3,836,020 | A | 9/1974 | Lassig |
| 3,952,891 | A | 4/1976 | Terayama et al. |

(Continued)

FOREIGN PATENT DOCUMENTS

EP   0 302 569   2/1989

(Continued)

OTHER PUBLICATIONS

EPO Communication "Observations of a Third Party" mailed Nov. 30, 2010 in connection with EP Application No. EP 06 735 745.9.

(Continued)

*Primary Examiner* — Ramya Burgess
(74) *Attorney, Agent, or Firm* — McGuireWoods LLP

(57) ABSTRACT

A system and process for improving container flow within a port facility, including improved equipment and software for controlling operation and flow of the equipment in the part facility. The system may include a port facility geographically arranged to separate land operations and water operations. Land operations such as over-the-road missions and rail missions may use landside access areas positioned at one end of a yard including rows of container stacks. Water missions such as loading/discharging a vessel may use waterside access areas positioned at the opposite end of the yard. Automated cranes linked with a terminal operating system may pick/drop/shuffle containers and/or refrigerated containers ("reefers") within the container stacks. Shuttle trucks may be used to pick/drop containers at quayside access points and the waterside access areas. The shuttle trucks may utilize shared wheelpaths. Software systems may be used to implement various principles of the disclosure.

23 Claims, 19 Drawing Sheets

U.S. PATENT DOCUMENTS

| | | | |
|---|---|---|---|
| 4,158,416 | A | 6/1979 | Podesta |
| 5,505,585 | A | 4/1996 | Hubbard |
| 5,511,923 | A | 4/1996 | Dunstan |
| 5,712,789 | A | 1/1998 | Radican |
| 5,780,826 | A | 7/1998 | Hareyama et al. |
| 5,876,172 | A | 3/1999 | Di Rosa |
| 5,951,226 | A | 9/1999 | Fantuzzi |
| 6,524,050 | B1 | 2/2003 | Arntzen et al. |
| 6,665,585 | B2 * | 12/2003 | Kawase ............... 700/226 |
| 6,698,990 | B1 | 3/2004 | Dobner et al. |
| 6,802,684 | B2 | 10/2004 | Amtzen et al. |
| 6,902,368 | B2 | 6/2005 | Hagenzieker et al. |
| 6,928,336 | B2 * | 8/2005 | Peshkin et al. ............... 700/245 |
| 7,410,339 | B2 * | 8/2008 | Franzen et al. ............ 414/140.3 |
| 7,987,017 | B2 | 7/2011 | Buzzoni et al. |
| 2002/0044854 | A1 | 4/2002 | Franzen et al. |
| 2002/0071743 | A1 | 6/2002 | Amoss, Jr. |
| 2002/0102150 | A1 | 8/2002 | Dunstan |
| 2003/0047529 | A1 | 3/2003 | Dobner et al. |
| 2003/0167214 | A1 | 9/2003 | Kang |
| 2004/0030478 | A1 | 2/2004 | Holland et al. |
| 2004/0126205 | A1 | 7/2004 | Amoss, Jr. et al. |
| 2004/0215367 | A1 | 10/2004 | King et al. |
| 2005/0027435 | A1 | 2/2005 | Scheppmann |
| 2005/0171787 | A1 | 8/2005 | Zagami |
| 2005/0226713 | A1 | 10/2005 | Tsafaridis |

FOREIGN PATENT DOCUMENTS

| | | |
|---|---|---|
| EP | 1 182 154 | 2/2002 |
| EP | 1 178 942 | 5/2003 |
| EP | 1 481 927 | 12/2004 |
| EP | 1 481 928 | 12/2004 |
| EP | 1 478 585 | 8/2005 |
| JP | 53 051881 | 5/1978 |
| WO | WO 03/074397 | 9/2003 |

OTHER PUBLICATIONS

Annex 1: Christopher Blackstone, "An Application that is patently ridiculous.".
Annex 2: Claim 1 structured into features 1a) to 1h).
Annex 3: Claim 26 structured into features 26a) to 26h).
Annex 4: Claim 31 structured into features 31a) to 31j).
Annex 5: Claims 1 to 5 of U.S. Appl. No. 60/655,876.
Gottwald Port Technology, Brochure "Automated Stacking for Container Terminals," Mar. 2003, pp. 1-8.
European Search Report and Written Opinion mailed Apr. 27, 2010 in connection with EP Application No. EP 06735745.9.
XP008120423, Container terminal operation and operations research—a classification and literature review, Steenken, et al., Apr. 1, 2004.
XP010608409, A Comparison of Different AGV Dispatching Rules in an Automated Container Terminal, Liu et al., Sep. 3, 2002.
XP004613121, Yard trailer routing at a maritime container terminal, Nishimura et al., Jan. 1, 2005.
Stack Handling System Design, Weischemann & Rijsenbrij, 2004, pp. 1-18.
A drawing of a container-handling facility, dated 1999 and 2000.
International Search Report, dated Sep. 20, 2007 and Written Opinion of the International Searching Authority, dated Sep. 20, 2007.
NTB—North Sea Terminal Bremerhave.
CTA—HHLA Container Terminal Altenwerder; "Container Terminal Altenwerder The Operating System", Author: Dr. Thomas Koch, Date: Sep. 24, 2001.
CTA—"HHLA Container—Terminal Altendwereder GmbH", Date: Nov. 22, 2002.
ECT (European Container Terminals)—"Fast Forward"; Progress Report, Date: Summer 2002, Issue 24.
Anonymous; Tagged by DGPS:, Cargo Systems; Aug. 1997; p. 58.
Ki-Chan Nam, et al.; "Evaluation of Handling Systems for Container Terminals", Journal of Waterway, Port, Coastal, and Ocean Engineering; May/Jun. 2001; pp. 171-175.
Ebru K. Bish; 20030101: "A multiple-crane-contained scheduling problem in a container terminal", Elseveir, 2001 (www.sciencesdirect.com).
Iris F.A. Vis, et al.; 20050501: "Trans-shipment of conatainers at a container terminal: An overview", Elsevier, 2003, (2003) www.sciencesdirect.com).
Etsuko Nishimura, et al. 20050101: "yard Trailer routing at a maritime container terminal", Elsevier, 2005 (www.sciencesdirect.com).
Maurizio Bielli, et al.; 20050301: "Object oriented model for container terminal distributed simulation"; Elsevier, 2005 (www.sciencesdirect.com).

* cited by examiner

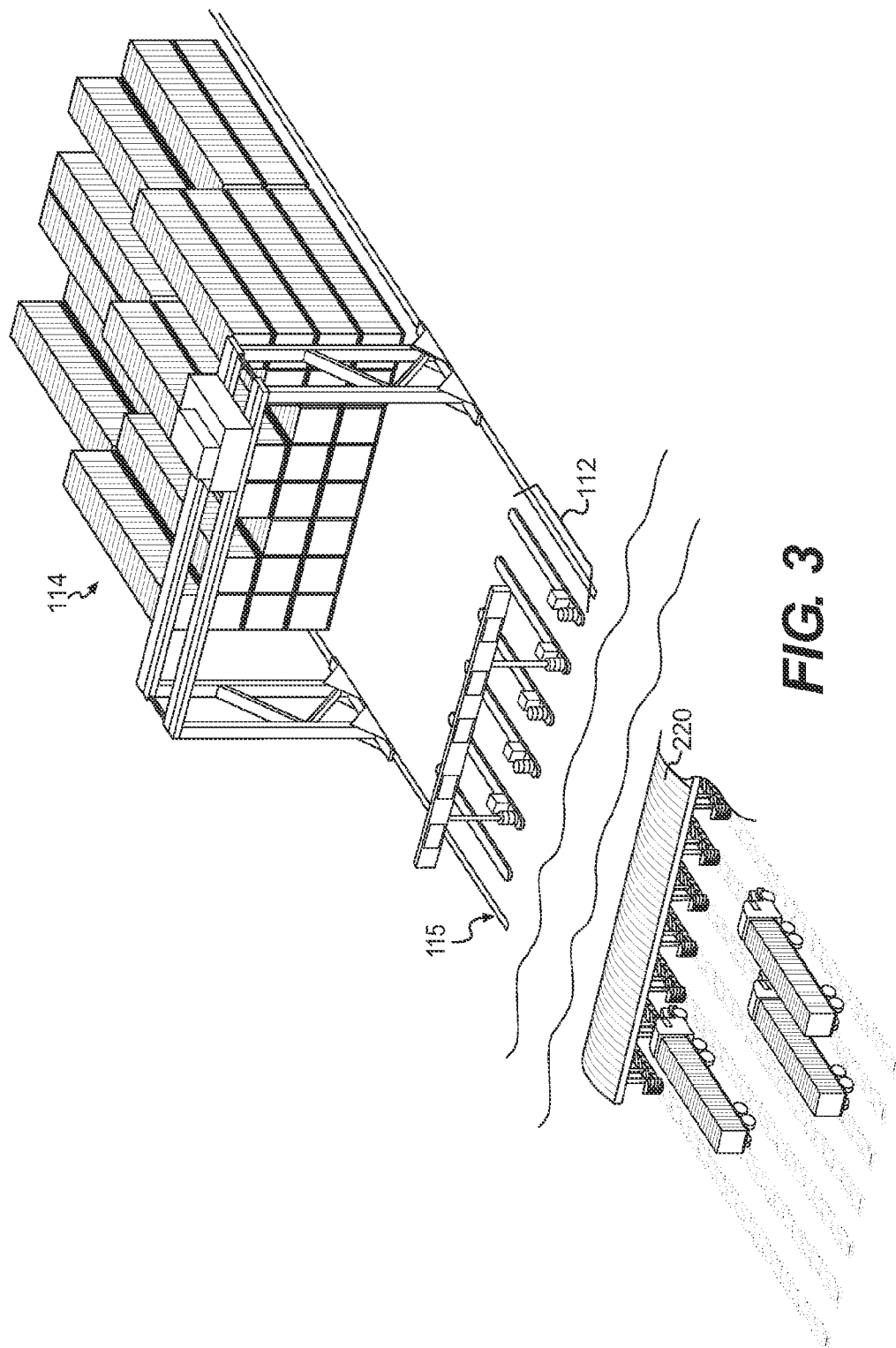

SYSTEM AND PROCESS FOR IMPROVING CONTAINER FLOW IN A PORT FACILITY

CROSS-REFERENCE TO RELATED APPLICATIONS

This application is a continuation of U.S. patent application Ser. No. 11/359,438, filed Feb. 23, 2006 and now U.S. Pat. No. 7,987,017 which claims priority under 35 U.S.C. §119(e) to U.S. Provisional Application No. 60/655,876 filed on Feb. 25, 2005. The disclosure of each of the above-referenced patents and/or applications is hereby incorporated by reference in its entirety.

BACKGROUND OF THE DISCLOSURE

1. Field of Disclosure

The field of disclosure relates generally to the transport of freight containers, and more particularly, to a system and process for improving container flow at a port facility, as well as improved equipment and/or software for use in such a facility.

2. Background Description

Freight containers have been used for many years to transport dry and refrigerated goods across the world's oceans, or land. For local land moves, metal containers, which may range in size from 20' to 45' and can carry loads ranging up to 85,000 lbs., are carried on trailer chassis which are towed by semi-tractors. For long distance land moves, the containers are stacked on flatbed railroad cars, which are pulled by diesel or electric locomotives. For water moves, the containers are stowed in specially designed holds and/or on the decks of barges or ships.

Port facilities, often measuring hundreds of acres in size, have been established at various places throughout the world to facilitate the transfer of the containers from one form of transportation to another. Some of the world's most famous ports include the terminals at Long Beach, Calif., New York, N.Y., Yantian, China, and Hong Kong. At each port, large quay cranes are strategically positioned along the quay line. Operating day and night, the quay cranes transport containers from land-based trucks and trains to the holds and/or decks of sea-going container ships. The quay cranes include an operator's booth and are operated by human operators who work hourly shifts. In operation, an empty train car or truck chassis is positioned beneath the quay crane's boom. A container is lifted from the container ship berthed against the quay and must be precisely maneuvered to engage the train car or truck chassis. Once the container is secured, the process repeats until the necessary unloading is complete. Alternatively, a ship-to-shore crane may lift a container from the ship and place the container on the ground. A straddle carrier, often positioned behind the quay crane, then hoists the container from the ground and loads the container onto a truck chassis or railroad car positioned beneath the straddle carrier. The processes described above operate in reverse to transfer containers borne by trucks and trains to the container ship.

The loading and unloading processes described above have several disadvantages. Human operators are prone to make mistakes, especially when tired. Further, picking a container from a train car or truck chassis, or lowering a container to the same, is difficult and time consuming even in the best of weather, but may be extremely difficult during inclement weather. In addition, the quay cranes tend not to be used to their fullest operating capacity because the time it takes to load or offload a train car or trailer chassis is longer than the time it takes to transfer a container from ship to shore or vice versa. Further, significant delays may be experienced if a truck or train malfunctions or is misdirected. In such instances, the quay crane cannot operate until another train or truck is properly positioned. This poses problems for the container ships, which are often in port only between tides. A delay in loading or unloading the container ship may result in the ship missing its scheduled departure time. In addition, the manual nature of container terminals sometimes results in the transfer of containers to/from ships to trucks being done in a chaotic manner. Consequently, the traffic flows are accident prone. Further, limitations in existing equipment limit the density of container stacks. This means it takes a large area of real estate to support a given level of container storage.

Thus, there is a need for an improved port facility, including improved equipment and software, that provides increased efficiency of operation and improved container flow.

SUMMARY OF THE DISCLOSURE

This disclosure meets the foregoing needs and avoids these and other drawbacks and disadvantage of the prior art by providing a port facility equipped to automate container handling through a terminal operating system, which may provide suitable controls for automated routing of container transport vehicles entering the port facility, to provide an improved lane design for efficient movement of containers on land, a regulated access system that allows multiple containers to be transported on land in close proximity to each other, and/or a container access area or buffer that maximizes efficient use of container transport equipment. Motorized vehicles called shuttle trucks may be used as the primary system for moving containers between one or more quayside access points (i.e., locations near quay cranes) and one or more waterside access areas (locations near the waterside end of the container stacks). The terminal operating system may provide overall manipulation, monitoring, and control of one or more of the functions that occur in the terminal.

According to one aspect of the disclosure, a container handling facility may have a landside for receiving vehicles and a waterside area for servicing marine vessels, including but not limited to ships and barges, and having one or more quay cranes in a quayside area for loading and unloading containers from the marine vessels. The container handling facility may include multiple container stacks. Each container stack may have first and second distinct and spaced access areas. The first access areas may be disposed near the waterside area to facilitate transfer and buffering of containers between marine vessels and the container stacks. The second access areas may be disposed adjacent the landside to facilitate transfer of containers between vehicles and the container stacks. Each container stack may have first and second mobile cranes mounted on a common track to move containers in and out of the container stack. The first mobile crane may service the first waterside access area and the second mobile crane may service the second landside access area of its respective container stack. A plurality of waterside intra-facility vehicles lifts and transports containers along variable routes between the quayside area and the first waterside access areas of said container stacks. An electronic intra-facility vehicle identification system identifies an intra-facility vehicle to receive at least one container at one of the first waterside access areas.

According to another aspect of the disclosure, a method of operating an automated container handling facility to provide an improved container flow includes the steps of: obtaining information characteristic of a plurality of containers and/or their contents from one or more electronic sensing systems; routing a first vehicle to a pre-determined landside access area of a container stack; routing a second vehicle to a pre-determined waterside access area of the container stack; operating a first mobile crane associated with the container stack to load or unload one or more containers at the landside access area; operating a second mobile crane mounted on a common track with the first mobile crane to load or unload the one or more containers at the waterside access area; and updating an inventory with the obtained information characteristic of the plurality of containers and/or their contents.

According to yet another aspect of the disclosure, a container handling facility includes multiple container stacks, with each container stack having first and second distinct and spaced access areas. The first access areas may be disposed adjacent a waterside area for servicing marine vessels to facilitate transfer and buffering of containers between marine vessels and the container stacks. The second access area may be disposed adjacent a landside area for receiving vehicles to facilitate transfer of containers between vehicles and the container stacks. Each container stack includes first and second means, mounted on a common track, for moving containers in and out of the container stack. The first moving means may service the first waterside access area, and the second moving means may service the second landside access area of its respective container stack. The container handling facility further includes means for controlling at least one of the moving means disposed remote from the at least one moving means, means for lifting and transporting containers along variable routes between a quayside area having one or more quay cranes to load or unload containers from marine vessels and the first waterside access areas of the container stacks, and means for identifying the lifting and transporting means at one of the first waterside access areas.

An exemplary embodiment of a container handling facility constructed according to principles of the disclosure separates land and water operations. Multiple container stacks may be provided, and each container stack may be serviced by a pair of typically identical un-manned, automated and/or remotely operated, rail mounted gantry cranes (RMGs) that operate on the same set of tracks. A waterside interface allows the buffering of multiple containers. One example of this buffering includes grounding containers at the quayside access points and/or grounding containers at the waterside access points. The grounding of containers decouples operation of the quay crane(s) from the operation of the stack, and thus improves overall efficiency of the automated terminal. As another example, buffering may include the stacking of containers on other containers within a landside access area, a waterside access area, a container stack, and/or at a quayside access point. In some cases, the buffering may include placing containers directly on the ground or on other containers. Buffering containers on the ground avoids the need to coordinate the schedules of the quaycranes and shuttle trucks or to coordinate the schedules of the RMGs and the shuttle trucks, which improves container flow.

The container handling facility may further include two separate entry/exit areas for each container stack (e.g., landside and waterside). A remote operator interface for the automated RMG's may be provided for landside operations, waterside operations, and/or exception conditions inside the stack. Additionally, the bifurcation of landside and waterside operations means that export containers enter from the landside of the container stacks and are migrated to the waterside. Import containers enter the container stacks on the waterside and are migrated to the landside. Trans-ship containers enter and exit from the same side (e.g., the waterside). Other features of a container handling facility constructed according to principles of the disclosure may include a landside staging area capable of handling multiple vehicles at each stack. The landside staging area may also include a safety booth for vehicle drivers. (Exemplary architecture and positioning of such safety booths are shown in FIG. 3). A vehicle identification system may be employed and use radio frequency identification (RFID) or similar wireless technology to locate vehicles within the landside staging area. Additionally, the coordinated operation of the pairs of automated RMG's in each stack preferably is controlled and managed by software.

Further, the disclosure may include a regulated access system capable of reducing accidents in traffic flows. The regulated access system may allow multiple simultaneous transfers to occur. In addition, differential GPS or other navigational systems may be used on the shuttle trucks or similar vehicles to track the final destination of the containers. In one embodiment of the disclosure, the landside system may be connected to a multi-lane roadway that allows vehicles to queue for different service areas. This improves overall traffic flow to and from the service areas. Types of service areas that may be provided in embodiments of the disclosure include, but are not limited to, RMG container stacks, an empty container buffer area, a refrigerated container service area, a rail buffer area, a chassis service area, and a control center/driver's assistance area. A multi-track, on-dock railroad facility may also be provided for direct transport to/from train cars. In one embodiment of the disclosure, the entry gates may use optical character recognition (OCR) and RFID technology to identify containers and chassis. Drivers may be identified using biometric information. Further, the entry gates may use an automated routing system that displays routing information on viewable displays to direct incoming vehicles to the proper service lanes. The automated gate system may further include a remote operating facility, staffed by human operators, to handle gate exception conditions. Differential GPS may be used on terminal utility vehicles to accurately trace the location of containers.

An exemplary embodiment of an automated routing system for an entry gate constructed according to the principles of the disclosure includes sensors, cameras, computers, and other digital/electronic equipment that will sense associated vehicle and/or container parameters dynamically while the vehicle transits an identification portal using RFID and OCR technology. The sensed information may then be compared with one or more digital or electronic data modules in which known, planned attributes are stored. Visual and/or audio instructions, created based on this comparison, are presented to the vehicle drivers to direct them to the appropriate service lane. Thus, customized communications are issued to specific incoming vehicles based on their individual visit parameters. In one embodiment, these processes may be performed with each vehicle moving at speeds of about 15 mph to about 25 mph.

Further, to reduce the cost of gate equipment, incoming vehicles may share a series of scanning and identity lanes (portals). Once scanned, the lanes may fan out to a larger number of inbound lanes that support the overall volume of business traffic. One advantage of using an automated gate routing system constructed in accordance with the principles of the disclosure is that such use permits the sorting of incoming traffic based on visit parameters and available service lane length. In turn, this improves overall container flow, not only by separating problem traffic early on, but also by offering a faster transit time for standard transactions, and by balancing work among incoming lanes.

In another embodiment of a container handling facility constructed according to the principles of the disclosure, each container stack (e.g., multiple lanes of stacked containers spanned and serviced by at least two mobile cranes mounted on a common track) may include a first waterside access area and a second landside access area. To maximize use of the waterside access areas, adjacent lanes within each waterside access area may share a common wheelpath. As explained in more detail below, each access area may include multiple access zones. Due to the shared wheelpathing, shuttle trucks may include one or more regulated access systems. Further, a coordinating software system may be implemented to coordinate the routes and/or activities of each shuttle truck.

The shared wheelpathing maximizes the number of containers that can be stored in an access area. Depending on the lane configuration, the wheelpath overlays may provide about a 25% increase in access area capacity over conventional access area layouts. This additional capacity may be used to create a buffer, which is used to de-couple the waterside servicing operations from the RMG stack cranes. As explained in more detail below, de-coupling improves the overall efficiency of the RMG stack cranes, as well as other equipment used to load/unload the container ships. Two RMGs, mounted on the same track, may service each container stack.

An exemplary embodiment of a regulated access system of the disclosure may allow multiple shuttle trucks to work in close proximity with each other and other pieces of equipment, such as the RMG stack cranes. The regulated access system may include a laser sensing system which is located at an appropriate height and position within an access area so as to sense the presence of one or more shuttle trucks at any access point within the access area. In another embodiment, the regulated access system may include one or more of the following hardware and/or software components: an electromagnetic detection system, an in-ground radio frequency (RF) (or other wireless) sending system, two or more cross-corner RF (or other wireless) transmitters on each shuttle truck, traffic control lights, an interface to the crane service system, an emergency stop mechanism, a fail safe monitoring system, and a sensing system on selected RMG stack cranes to determine the presence of shuttle trucks.

The shuttle trucks (STs), which operate in the waterside access area, may pick up and drop off containers at multiple, pre-defined positions. Each ST may be 1 over 1 (two containers of load carrying height) high, and may be equipped with spreader bars which are capable of handling twin 20' containers. The ST will have two modes of operation, online and offline. In the offline mode, the ST will not receive commands from the terminal operating system (TOS). It is anticipated that the offline mode will only be used for maintenance. In one embodiment, STs may be motorized vehicles and may be manned and capable of straddling and hoisting multiple stacked containers.

Using their regulated access system, RMG stack cranes may automatically pick up or discharge containers at the access points when the access area is free of shuttle trucks. In contrast to conventional systems, in which containers are delivered to stacks on terminal trucks one at a time, use of the shuttle trucks of the disclosure eliminates the former need for the truck and crane to be synchronized and manually coordinated to work together. Use of the regulated access system and shuttle trucks of the disclosure may greatly reduce deadtimes and the chances of collisions between equipment, as well as allow multiple pieces of equipment to work in the close proximity, and provide a safer work environment for machine operators and other personnel.

An exemplary embodiment of a multiple container access area/buffer of the disclosure may include one or more pre-designated access zones and corresponding container stacks. As previously explained, this arrangement de-couples the operation of the shuttle trucks, which are loading/unloading the vessel from the operation of the RMG stack cranes, thus allowing both types of equipment to work at their own pace. Variations in work cycle timing are accommodated by this type of buffering.

The shuttle trucks may negotiate access to a quayside access point or waterside access point to drop off a container and/and pick up a container at the same location. This tends to be significantly more efficient than having to negotiate a single access point repeatedly. As a result, vessels can be turned (e.g., unloaded/loaded) faster than conventional processes allow, using a small number of shuttle trucks.

Additional features, advantages and embodiments of the disclosure may be set forth in the following detailed description, drawings, and claims, including methods of using the disclosure to improve container flow in an automated port facility. Although numerous implementations and examples of the disclosure are set forth in the patent including in this "Summary of Disclosure" section, the examples and implementations are not intended to limit the scope of the disclosure.

BRIEF DESCRIPTION OF THE DRAWINGS

The accompanying drawings, which are included to provide a further understanding of the disclosure and are incorporated in and constitute part of this specification, illustrate preferred embodiments of the disclosure, and together with the detailed description, serve to explain principles of the disclosure. In the drawings:

FIG. 3 is a perspective view of a portion of the automated entry gate of FIG. 2;

DETAILED DESCRIPTION

Figure 1:
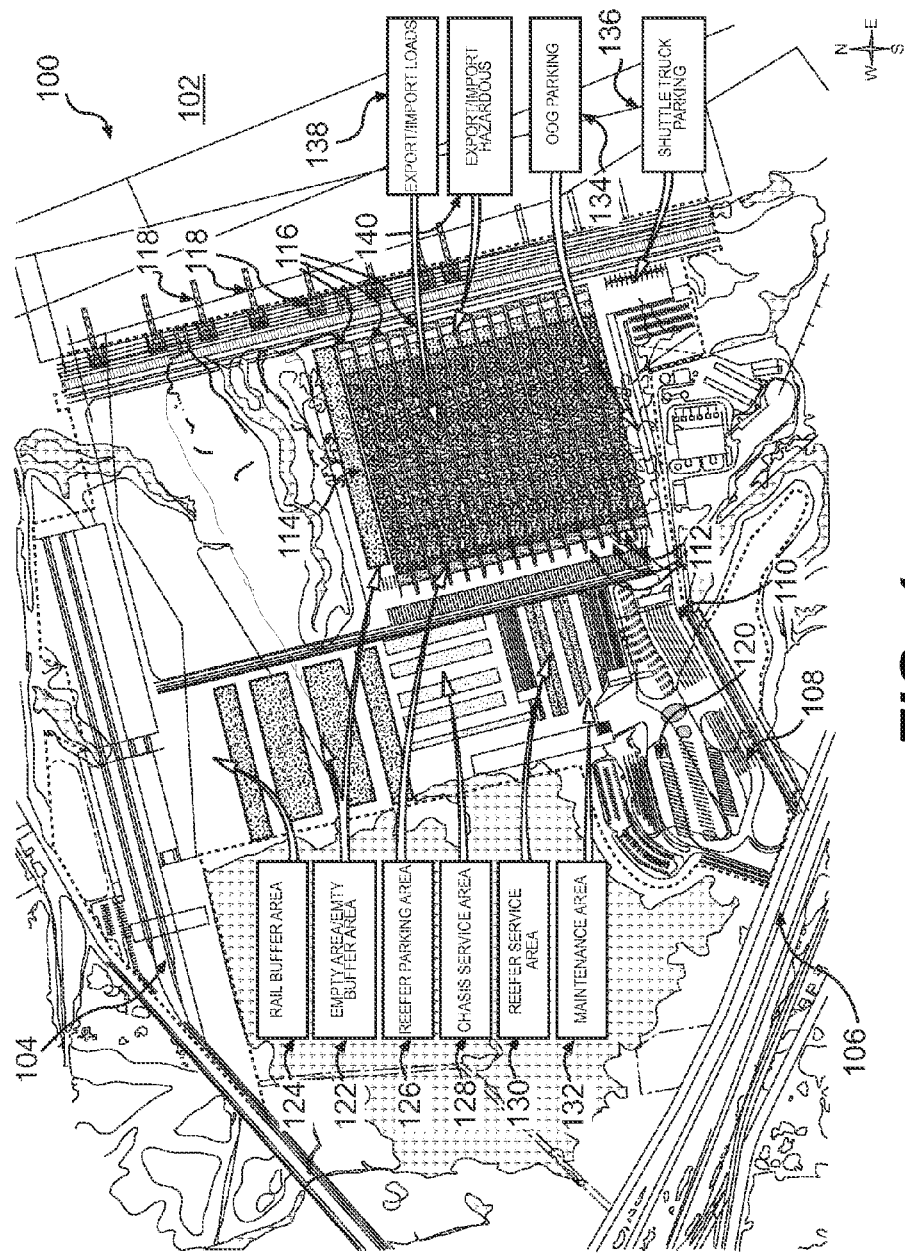
FIG. 1 is a plan view showing a layout of an exemplary container handling facility constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law.

FIG. 1 is a plan view showing a layout of an exemplary container handling facility 100 constructed according to the principles of the disclosure. Positioned adjacent deep water 102, the container handling facility 100 positioned nearby to a railroad 104 and interstate highway 106. The railroad may include multiple lines, each holding a plurality of railroad cars.

One or more radio frequency identification (RFID) scanners or readers may be positioned above the lanes of the highway 106 to provide advanced warning to the container handling facility 100 of the impending arrival of a transport vehicle, such as, but not limited to, a semi-tractor and/or trailer. Several scan lanes 108 branching off from the highway 106 include RFID scanners and optical character recognition (OCR) scanners or readers, or similar devices, which interact with incoming support vehicles to provide each vehicle with customized routing information. The scan lanes 108 widen into a larger number of service lanes 110 that provide access to the landside access areas 112 located at the ends of the container stacks 114. Each landside access area 112 may be configured to handle multiple vehicles at the same time. Each landside access area 112 also includes a safety booth in which vehicle drivers can stand while containers are loaded or unloaded from the vehicles. A vehicle identification system may use RFID to identify vehicles and/or containers within each landside access area 112.

The container stacks 114 are positioned to separate land and water operations, and each stack is serviced by a pair of un-manned rail mounted gantry cranes ("RMGs") that typically are identical and operate on the same set of tracks. A series of waterside access areas 116 allows the buffering of multiple containers. That is, the waterside access areas 116 may provide temporary storage for containers under various circumstances. On the water operations side, manned motor vehicles called shuttle trucks ("STs") equipped with regulated access systems pickup and drop off containers at waterside access areas 116 and at lanes within each waterside access area). Containers are loaded/unloaded from the waterside access areas 116 adjacent the waterside ends of the container stacks 114, by the automated RMGs, while containers are loaded/unloaded from the quayside access points by one or more quay cranes 118.

The bifurcation of landside and waterside operations means that export containers enter from the landside of the container stacks and are migrated to the waterside. Import containers enter the container stacks on the waterside and are migrated to the landside. Trans-ship containers enter and exit from the same side (e.g., the waterside).

Other features of an container handling facility 100 constructed according to principles of the disclosure include, but are not limited to, a landside control building/drivers assistance center 120, an empty container buffer area 122, a rail buffer area 124, a refrigerator container (also referred to hereinafter as "reefers") parking area 126, a chassis service area (CSA) 128, a reefer service area 130, a maintenance area 132, an out of gauge (OOG) parking area 134, and a shuttle truck parking area 136. Sections of the container stacks 114 may be designated for export/import loads 138 and for hazardous import/export loads 140.

In one embodiment, the CSA 128 is a designated area with one point of entry and one point of exit. All ship line chassis which are being terminated/left on the terminal are received at the CSA, and all chassis being picked up from the terminal are picked up from the CSA. A ticket printed at the gate-in directs an over-the-road (OTR) driver of a truck where in the CSA to pick up a chassis. Chassis arriving at the CSA entrance are inspected by a mechanic. Inspections of trailer chassis may occur while the OTR truck remains connected to the trailer chassis.

The container handling facility 100 may further include an area for storing refrigerated containers mounted on chassis. Live reefers are accommodated by power plugs installed in the reefer service area, and terminal maintenance and repair mechanics may handle the unplugging and plugging of reefers. In one embodiment, the terminal operating system ("TOS") will issue a work order to maintenance and repair that indicates when and where a reefer needs assistance. The TOS will also dispatch a mechanic to execute the unplugging/plugging, and the mechanic may confirm to the TOS the completion of the work order task in real time.

On the waterside, the water line may include about 4000 feet (or more, or less) of quay line, and may be designed to accept one or more quay cranes 118. Within the terminal yard, the container stacks may be designed to accommodate RMGs spanning eight (8) containers wide with up to 150 (multiple containers high) access points located at the waterside end and up to 75 access points located at the landside end of each RMG module. The RMGs may be expected to lift over five high stacks (9'6" container heights are typical).

In addition, reefer racks may be located in each stack module. Each reefer rack may be equipped with reefer monitoring platforms and plugs for four high containers across eight rows. In one embodiment, to facilitate ease of use, the reefer racks are located in an RMG lane near the landside. This facilitates prompt plugging, unplugging, and monitoring of reefer containers. Light towers may be located around the perimeter of the RMG stack area to provide security illumination as well as illumination for nighttime operations.

A road for terminal traffic to access the various parts of the terminal may be located at the land side of the RMG stacks 114 adjacent the landside access areas. A large truck parking area may be positioned proximate the entry gate where trucks can park and receive driver assistance, so that the gate itself does not get blocked.

The container handling facility 100 may be operated using advanced computer systems and communications networks. Thus, for example, navigational systems may be used in conjunction with the TOS for determining and managing the positions of all the containers within the terminal. Exemplary navigational systems include Global Positioning Systems ("GPS") and Differential Global Positioning Systems ("DGPS"). In addition, terminal equipment may be installed with radio data terminals so that all instructions can be read by the operators in their cabins. Communications with the customers and users of the terminal may occur via an electronic data interchange ("EDI") and the Internet, or other network.

The container handling facility may further include a plurality of closed circuit television (CCTV) cameras installed around the perimeter of the terminal 100 and at strategic locations within the terminal 100. These cameras may be linked to and monitored by video screens located in a security office on the ground floor of the Administration building. Additionally, access controls may used in all buildings and sensitive areas of the terminal.

In one embodiment, the container handling facility 100 may be designed to handle current standard container sizes and Out-Of-Gage (e.g., cargo that is too large to fit within a container). In some instances, Out-Of-Gage shipments may require an appointment.

In contrast to conventional container handling facilities, there may be little or no physical labor presence at the gates. Therefore, no chassis or reefer inspection is conducted at the gate pedestals. Instead, chassis are inspected only on return to the CSA. All reefer inspections are conducted at the Reefer Service Area ("RSA"). Portals may be equipped with OCR to capture container numbers, chassis numbers, and genset numbers and hazardous placards recognition. Portals may also be equipped with high resolution cameras to capture digital images that are used for remote damage inspections and identification of hazardous placards.

Figure 2:
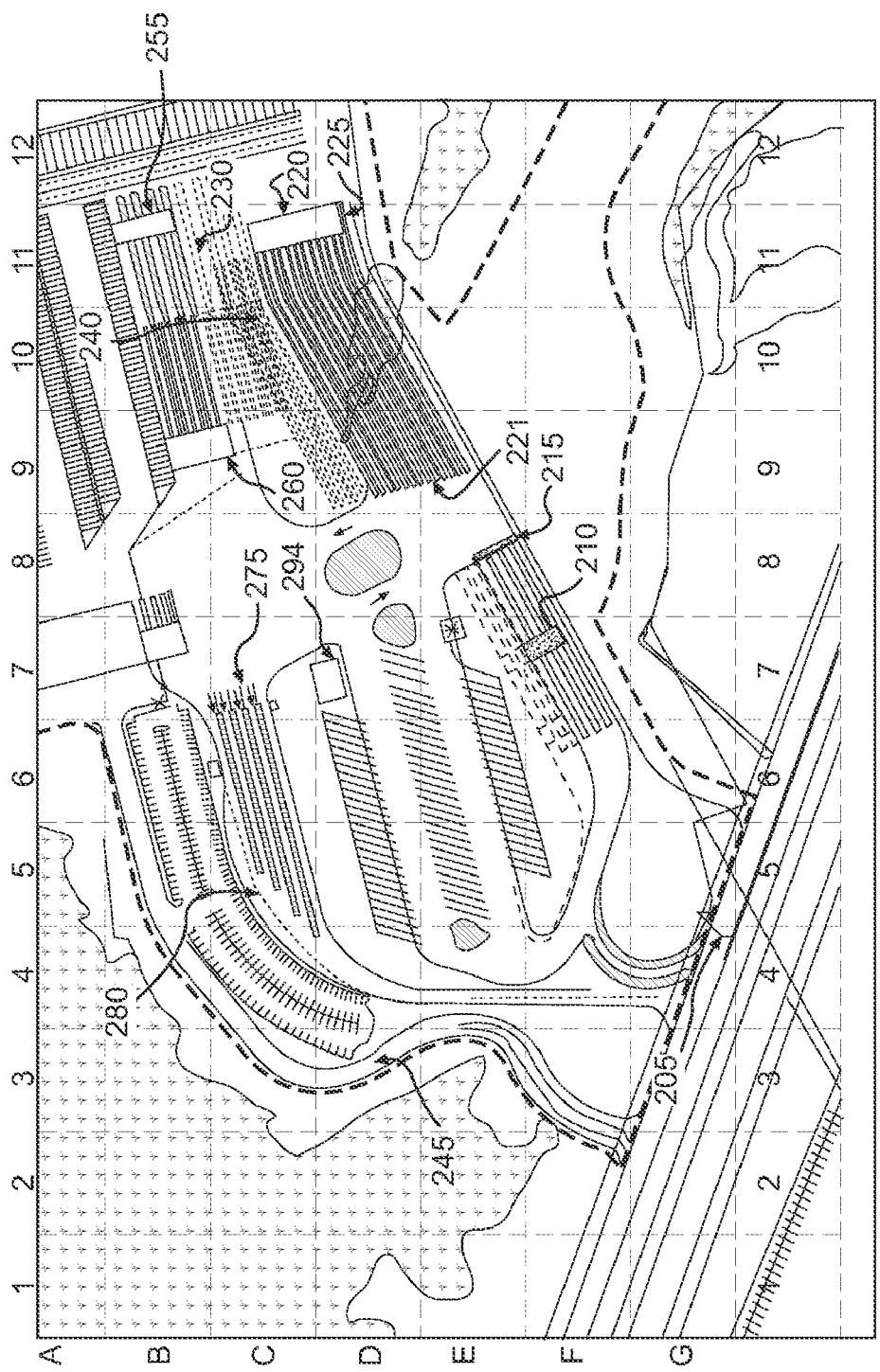
FIG. 2 is a plan view of an automated entry gate that may be used in the container handling facility shown in FIG. 1.
Figure 2A:
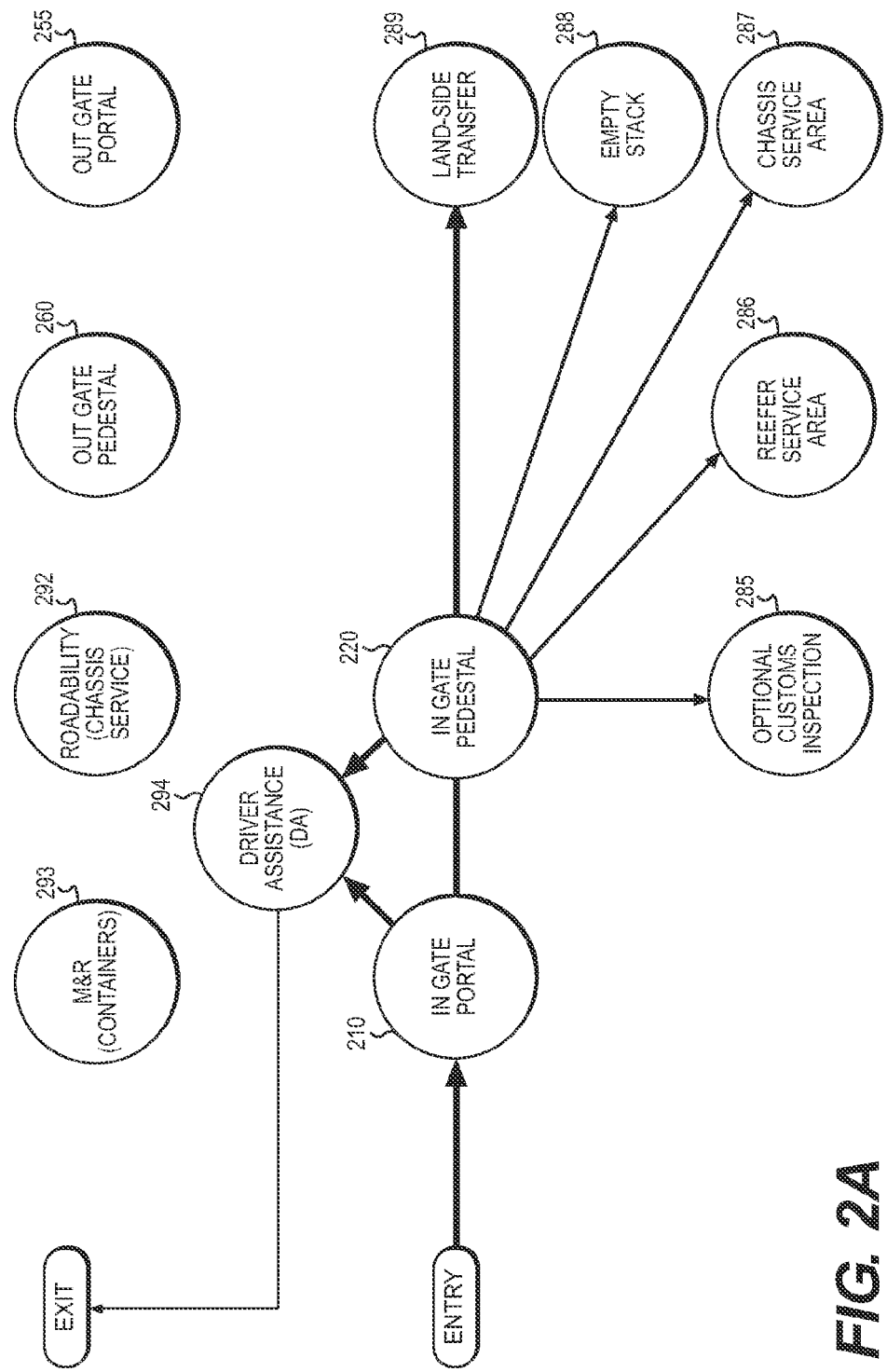
FIG. 2A is a flowchart illustrating an exemplary work flow for an in-gate process at a container handling facility constructed according to the principles of the disclosure.
Figure 2B:
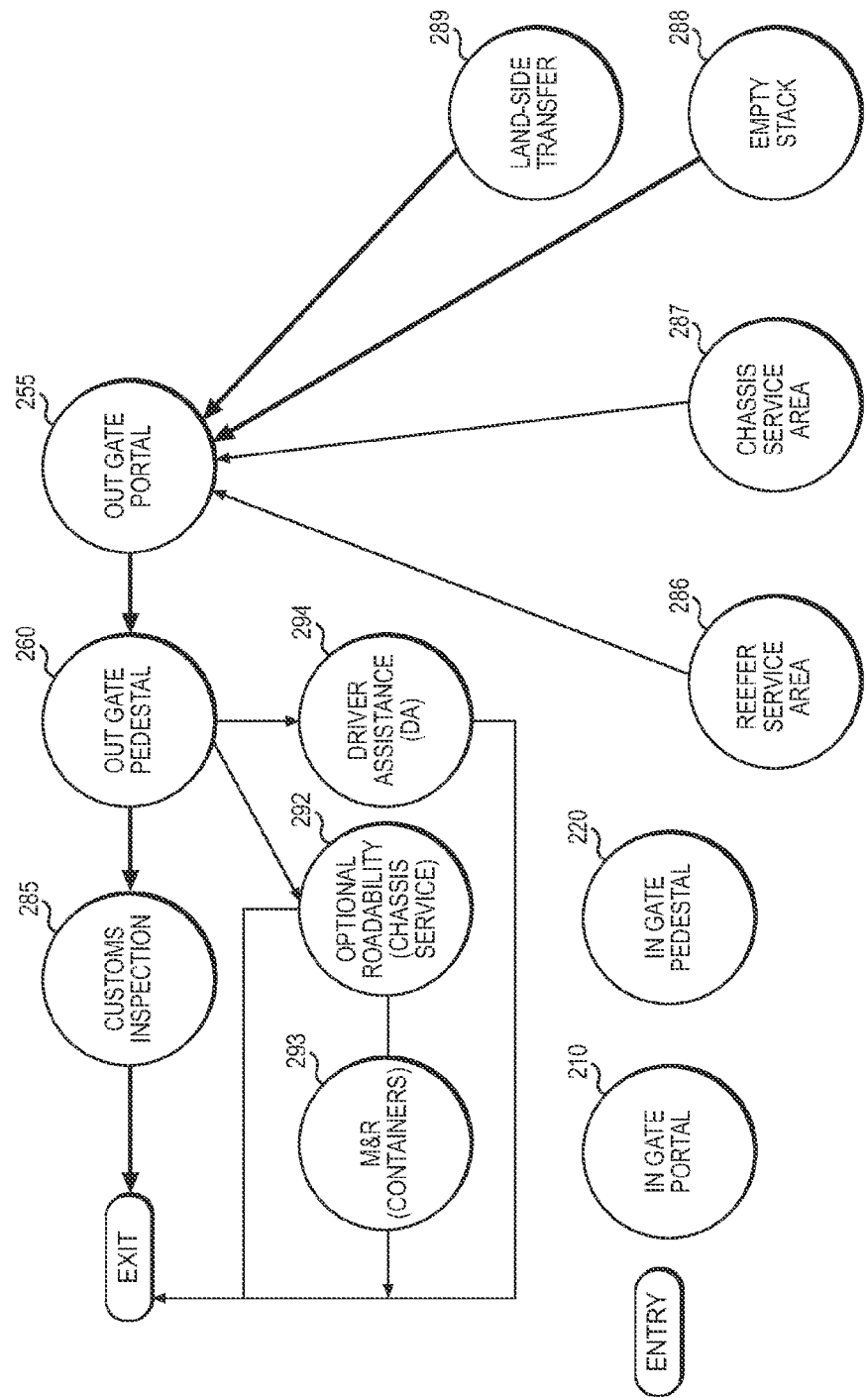
FIG. 2B is a flowchart illustrating an exemplary work flow for an out-gate process at a container handling facility constructed according to the principles of the disclosure.

FIG. 2 is a plan view of an automated in-gate that may be used in the container handling facility 100 shown in FIG. 1. Referring to FIGS. 1 and 2, inbound vehicles (with or without containers) pass under a remote sensing system 205, enter the container handling facility 100 via entry lane 108, and proceed through an identification and routing portal 210 to an in-gate pedestal 220 where driver identification may occur. The remote sensing system 205 may include a radio frequency identification ("RFID") receiver (or other wireless device) for receiving information from the inbound vehicle, its trailer chassis, and/or containers. To allow time for advance warning, remote sensing system 205 may be located along main road 106. Information obtained by the remote sensing system 205 is relayed to the TOS and verified. Following verification, the TOS may relay instructions to the vehicle driver that direct the inbound vehicle to the appropriate in-gate pedestal entry lane 221. After exiting the main road 106, the inbound vehicle passes by the identification and routing portal 210. Portal 210 may include an additional RFID or similar receiver, as well as an optical character recognition (OCR) reader to receive information from the inbound vehicle and/or container. After leaving the identification and routing portal 210, the inbound vehicle may pass under a message sign 215. The message sign 215 may display real-time or near real-time instructions identifying the specific in-gate pedestal entry lane 221 the inbound vehicle needs to be in, as well as directions to the driver assistance area for problem truck visits. The instructions displayed by the message sign 215 are created by the TOS based on the information obtained at the identification and routing portal 210. Moreover, these instructions are unique to particular inbound vehicles, and the message sign 215 may display three or more instructions simultaneously.

Thereafter, the inbound vehicle approaches the in-gate pedestal 220, where driver identification is performed using biometric or other data. After the vehicle driver has been identified, a trip ticket may be printed that directs the vehicle driver to a particular destination(s) within the container handling facility.

A static scale 225 may be positioned proximate the in-gate pedestal 220 to weigh the inbound vehicles and/or trailers. A guard escorted u-turn area 230 is provided for inbound vehicles that have been denied access. An OOG lane 240 is provided for inbound vehicles having cargo that has dimensions beyond the height, width and/or length of a standard container.

Out-gate portal 255 has an RFID or similar receiver to ensure that an outbound vehicle is in the correct lane to exit the container handling facility 100. At out-gate pedestal 260 an RFID receiver and inspection ensure that the outbound vehicle is ready to drive, and confirms that the appropriate container has been loaded.

U.S. Customs inspections occur at portals 275 and 280. Portals 275 and 280 may be equipped to perform x-ray and/or radiation inspections. Based on this information, U.S. Customs personnel determine whether an outbound vehicle is allowed to exit the container handling facility 100 or not.

Referring to FIGS. 1, 2, 2A, 2B, and 3 an exemplary in-gate operation and out-gate operation will be described.

Prior to an inbound vehicle and/or a container arriving at the container handling facility 100, a client, shipper, consignee, broker, agent, or ship line notifies a transportation company of a desired container move at the container handling facility 100. The transportation company dispatcher may then log into a container handling facility appointment web site to create an appointment that describes a planned inbound vehicle visit to the container handling facility 100.

In the appointment, the dispatcher specifies at least the inbound vehicle's RFID tag and whether the inbound vehicle is dropping off, picking up, or both. The dispatcher also indicates whether the designated container(s) is full or empty and whether it includes a trailer chassis, a genset, or both. The dispatcher may select from pre-determined time parameters to indicate the time at which the inbound vehicle is expected to arrive at the container handling facility.

Computers operated by or on behalf of the container handling facility 100 validate the information submitted by the dispatcher against other information about the designated container that is made available to the container handling facility and/or a ship line. After validation, the computers cause information to be displayed that indicates to the dispatcher whether that the other information matches that entered by the dispatcher.

If the dispatcher has requested an appointment time, the computers also cause information to be displayed that indicates to the dispatcher whether the requested appointment time is available. If so, the dispatcher receives appointment confirmation and dispatches the inbound vehicle to the container handling facility. If not, the dispatcher selects an alternate appointment time and dispatches the inbound vehicle upon computer confirmation of the new appointment time.

As the inbound vehicle travels to the container handling facility, the computers periodically review the appointment and compare it to the most recent information available from the ship lines and/or equipment within the container handling facility. If for any reason the appointment status has changed (for example, a container has been placed on hold by Customs), the computers notify the vehicle's dispatcher electronically, by fax, or both. In the event the vehicle's appointment is changed, the dispatcher is responsible for notifying the vehicle's driver.

Most inbound vehicles (except railcars) will approach the container handling facility 100 via the main road 106 and proceed past an in-gate portal 205 equipped with a radio frequency identification ("RFID") reader that is operatively coupled with the computers mentioned above. To allow advance knowledge of the impending arrival, the remote sensing system 205 may be located over (or alongside) the main road 106. If the inbound vehicle has an RFID tag, information about the inbound vehicle is captured by the remote sensing system 205. The captured information is then used by the computers along with information from the appointment (if any) to determine a potential routing of the inbound vehicle. This "early warning" allows a more efficient execution of the required work to service the inbound vehicle.

After exiting the main road 106, all inbound vehicles (except non-containerized out-of-gauge ("OOG") vehicles, containerized OOG vehicles exceeding portal dimensions, or railcars), must drive through the in-gate scanning and routing portal 210. Portal 210 is equipped with at least an optical character recognition ("OCR") system to collect the numbers of any equipment on the inbound vehicle, such as the container number, chassis number, and genset number, as well as hazmat placards (if any). The portal 210 is also equipped with high-resolution cameras to collect side and top view pictures of inbound containers. These pictures can be used for remote damage inspection and archiving. Portal 210 is further equipped with sensors that capture container length and height. All of the information obtained by the scanning and routing portal 210 is stored in a database for use by the Terminal Operating System and/or the in-gate pedestal 220.

Just after the inbound vehicle passes the in-gate portal 210, variable message signs 215, are generated to guide the vehicle and its driver to the in-gate pedestal lanes 221 or the Drivers Assistance ("DA") area 294. If desired, the in-gate pedestal lanes 221 may be designated as preferred lanes for various equipment conditions. For example, inbound vehicles with firm appointments that are carrying dry, full containers; empty containers; or with bare chassis or flatbeds may proceed to one or more lanes preferred for, but not restricted to those combinations. An inbound vehicle with a valid appointment arriving without a chassis (bobtail) or loaded with a refrigerated container may be directed to one or more lanes preferred for expedited handling. The bobtail receives expedited handling because it has no equipment to drop off or verify. Inbound vehicles with refrigerated containers receive expedited handling because they will be further routed to the Reefer Service Area ("RSA"). Inbound vehicles with failed or poor OCR reads are directed to one or more in gate pedestal lanes designated for handling such issues. Through the use of cameras, gate personnel capture the information missed by the portals and finish processing the inbound vehicle.

The following problems may be routed to the driver's assistance area 294:
 (a) inbound vehicles with no RFID tags;
 (b) inbound vehicles with tags but no appointments; and
 (c) inbound vehicles with equipment number or appointment issues.

At the driver's assistance area 294, drivers may obtain RFID tags. If the driver has no appointment or a problematic appointment (e.g. the inbound vehicle's equipment numbers do not match those in the appointment, the container has been held by Customs, or the booking or bill of lading details do not match what is in the appointment), he/she can get help from the Driver Assistance call center. The call center attendant provides first level support by identifying the problem and suggesting a course of action.

While the inbound vehicle travels from the in-gate scanning and routing portal 210 toward the in-gate pedestal 220, remote mechanics inspect any container(s) carried by the vehicle for damage using the high resolution pictures captured at the scanning and routing portal 210.

At the in-gate pedestal 220, additional RFID readers read the inbound vehicle's RFID tag again (if present) to confirm its identity, tying it with the previously obtained in-gate data. The RFID readers may be configured to further detect and record chassis, gensets, or seals. The in-gate pedestal 220 may also be equipped with a biometric system that will recognize and verify the identity of the inbound vehicle driver. Any biometric feedback may also be tied with the previously obtained in-gate data.

If the driver's credentials are invalid, a ticket is printed that directs the driver to the driver's assistance area 294. Messages indicating an attempted driver security breach are sent to a security department, the driver's dispatcher (if one can be identified), and to the executive information system. If the driver's credentials are valid, the numbers associated with the inbound vehicle and/or container are verified, and if the container (if any) passes remote inspection, a ticket is printed that instructs the driver to go to the Reefer Service Area ("RSA") 286, the Chassis Service Area ("CSA") 287, the Empty Stack Area 288, the RMG Landside Access Area 289, or some combination thereof, based on the information in the vehicle's appointment. The printed ticket includes a bar code, a reference map of the container handling facility 100 and all routing instructions to the driver's destination within the container facility. Information obtained by the remote sensing system 205, the scanning and routing portal 210, and/or the in-gate pedestal 220 may be routed to other systems/equipment within the container handling facility 100 to allow faster service times.

If the inbound vehicle's appointment requires the driver to drop a trailer chassis, the driver's ticket printed at the in-gate pedestal 220 will instructs the driver to drop the chassis at the Chassis Service Area ("CSA") 287 (if the driver is leaving a container, he will drop it first). If necessary, the printed ticket also instructs the driver to pick up a new chassis from the Chassis Service Area 287. If the remote mechanics note substantial damage to a loaded container, the driver will be directed to the driver's assistance area 294 where a manager or maintenance personnel will be notified to make further assessments or conduct a survey as required. Inbound vehicles having inspection problems that can be solved by the driver, including incorrect hazardous material placards are also routed to the driver assistance area 294, where the driver can take steps to correct the problem. Dirty empties and damaged full containers may be rejected, in which case the inbound vehicle will make a u-turn and exit the container handling facility 100.

Once a vehicle has completed its transaction(s) at one or more of the Reefer Service Area 286, the Chassis Service Area 287, the Empty Stack Area 288, or the Landside Access Area 289, the driver proceeds to the out-gate portal 255. The out-gate portal 255 captures the identity of any container(s) actually picked up and validates it against information accessible by the TOS (e.g. booking number, bill of lading, or Equipment Delivery Order ["EDO"]). After driving through the out-gate portal 255, all outbound vehicles are directed to the out-gate pedestal 260.

Outbound vehicles that are leaving without equipment (i.e. bobtails) are directed to a specific bobtail out-pedestal lane where their drivers will receive a receipt for the equipment they dropped. Thereafter a gate arm lifts and the drivers proceed to the Customs area 285, where installed surveillance equipment 275 and/or 280 will process the outbound vehicle upon its departure. Drivers with damaged chassis or containers may proceed to a Roadability Area 292 or to a Maintenance and Repair Area 293.

All other (non-bobtail) outbound vehicles proceed to other out-gate pedestal lanes, where an additional remote visual inspection of empties may be conducted. If there are no issues with the out-gate transaction, (i.e. no chassis mismatch, incorrect container, container or noted chassis damage), the driver receives a receipt for all completed moves associated with the outbound vehicle that occurred in the container handling facility, the gate arm lifts, and the outbound vehicle exits, passing the Customs area 285 and its installed surveillance equipment 275, 280. If there are issues with the out-gate transaction, the outbound vehicle is routed to the Driver Assistance Area 294 or the Chassis Service Area 292 and/or the Container Maintenance and/or Repair area 293.

Various aspects of the terminal of FIGS. 1, 2, and 3 will now be described in greater detail with respect to the remaining figures.

Figure 4:
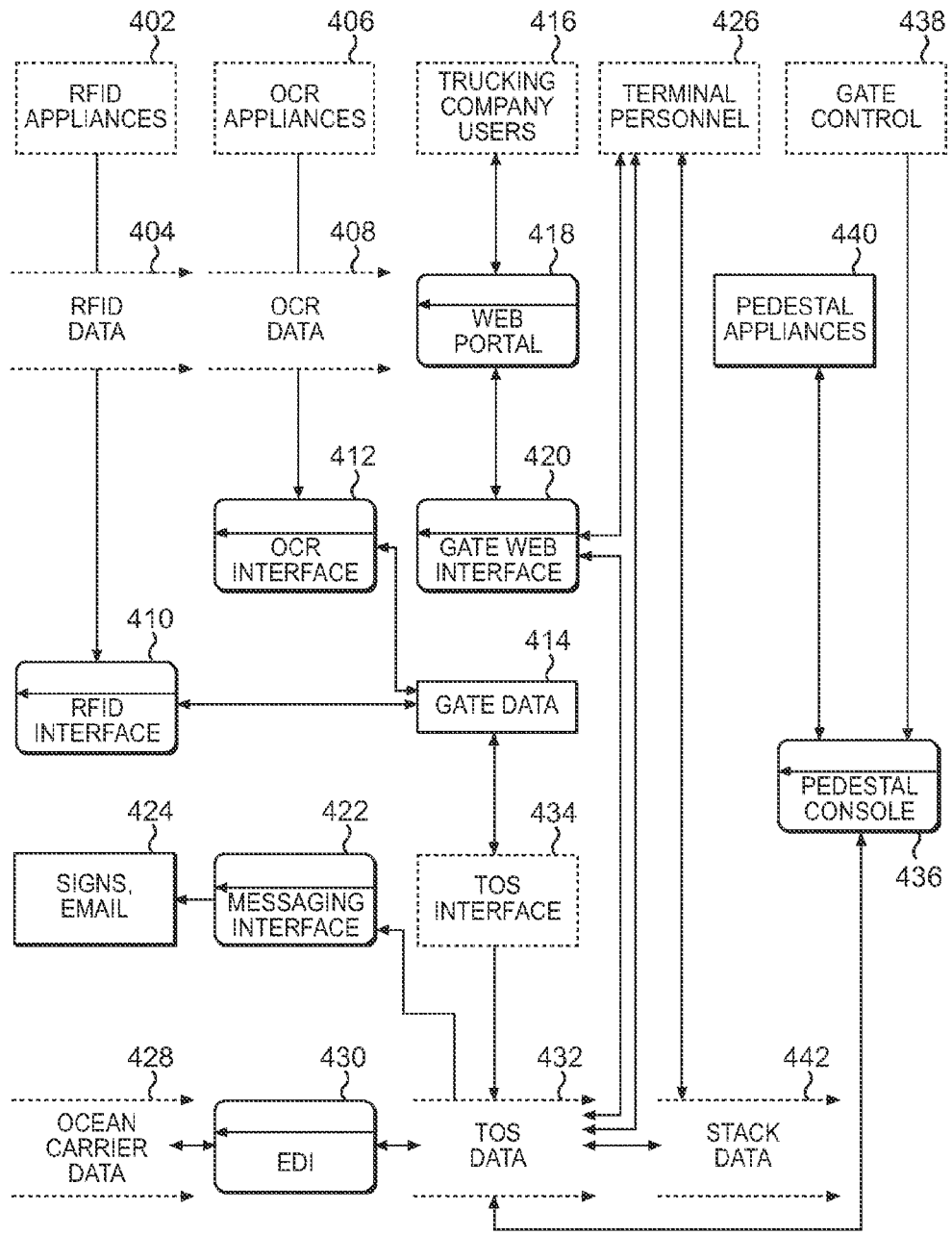
FIG. 4 is a flowchart illustrating one embodiment of data flow for a gate system constructed according to the principles of the disclosure.

FIG. 4 is a flowchart illustrating an exemplary data flow for a gate system according to the principles of the disclosure. Radio frequency identification (RFID) appliances 402 obtain RFID data 404 from container trucks approaching a gate. In addition, optical character recognition readers (OCR) appliances 406 obtain OCR data 408 from the container trucks approaching the gate. RFID data is processed at an RFID interface 410, while OCR data is processed at an OCR interface 412. The processed RFID data and the processed OCR data are combined into gate data 414, which may be accessed by the TOS via the TOS interface 434.

In addition, ocean carrier data 428 is provided to an electronic data interchange 430 and is then converted into terminal operating system (TOS) data 432. The TOS may be a computer system and software that administers, plans, and controls overall terminal operations. Stack data 442 is also combined into the TOS data 432. The TOS data 432 is provided to a TOS interface 434 and is also combined with the processed RFID data and the processed OCR data into gate data 414. Further, the gate data 414 is also combined to be included in TOS data 432. It is understood that based on the different parties viewing gate data 414 and TOS data 432, that gate data 414 and TOS data 432 may be in different formats and may not be identical.

Trucking company users 416 provide and access information at a web portal 418, which interacts with gate web interface 420. The web interface 420 may be used to access the combined TOS/gate data. The trucking company users 416 provide information about container trucks that will be approaching the gate, as well as obtain information, such as the status of the container trucks and ocean vessels.

Based on the combined TOS data 432 and gate data 414, messaging interface 422 provides instructions 424 to container trucks. Instructions may comprise signs, such as electronic signs, email alerts, instant messages, telephone alerts, such as cellular telephone alerts/or any other type of message.

Terminal personnel 426 may access gate web interface 420, TOS data 432 and stack data 442 during operation of the terminal. A pedestal console 436 accesses the TOS data 432 to control gate 438 and to provide information to pedestal appliances 440.

Figure 5:
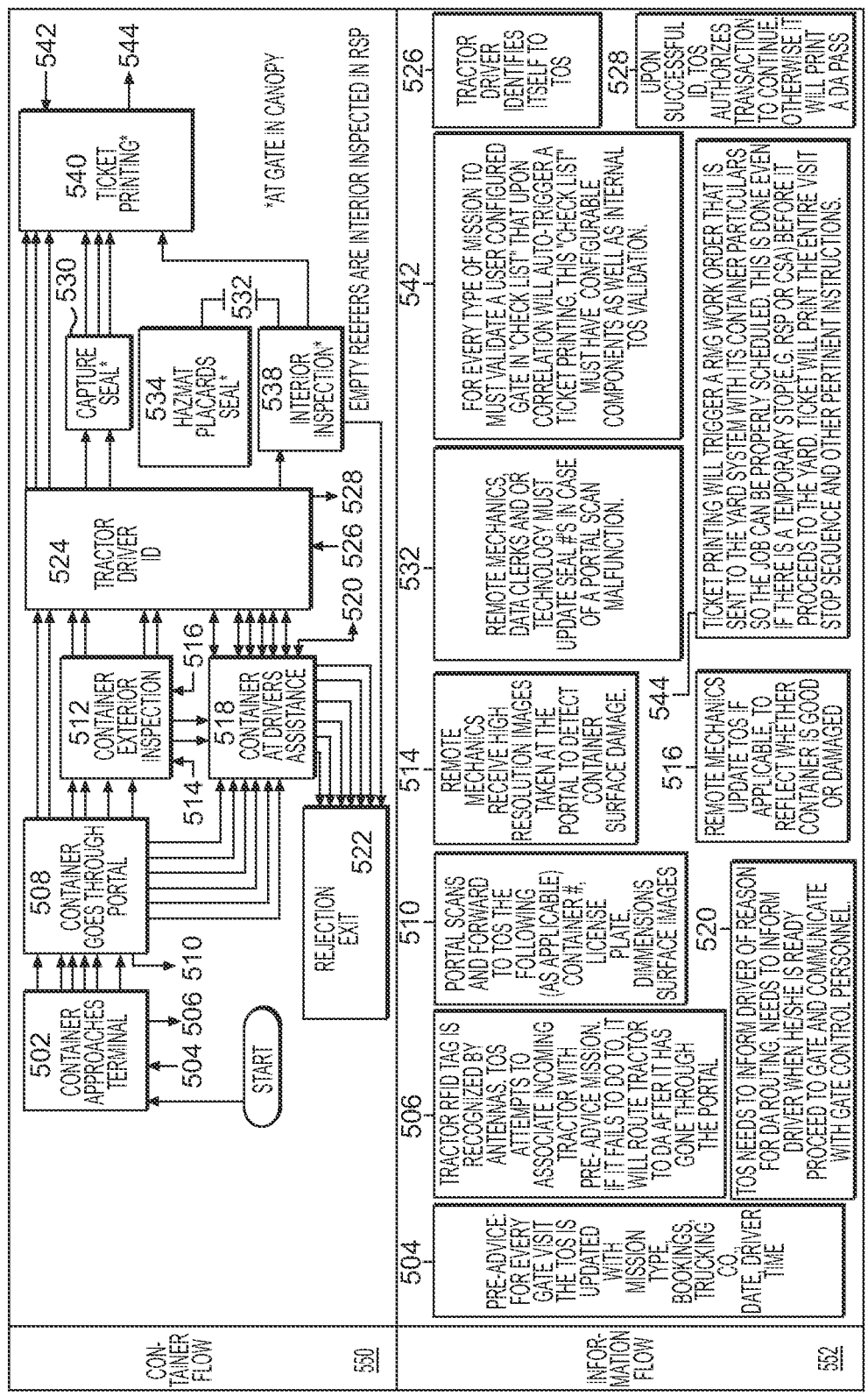
FIG. 5 is a flowchart illustrating how exemplary yard operations may be conducted in the container handling facility of FIG. 1.

FIG. 5 is a flowchart illustrating exemplary yard operations in the automated terminal facility of FIG. 1. More specifically, the interaction between container truck arrivals (container flow 550) at the gate and the RMG process (information flow 552) is shown in FIG. 5. There are various possibilities for an arrival at the gate, such as one single pick-up (discharge delivery), multiple pick-ups, one delivery (load receiving/discharge receiving), multiple deliveries, one pick-up (discharge delivery) and one delivery (load receiving/discharge receiving), multiple pick-ups and one delivery or one pick-up and multiple deliveries. For purposes of illustration, the process of FIG. 5 describes a single pick-up or delivery.

According to an embodiment of the disclosure, the process of FIG. 5 may result in an information flow to provide more predictable service times to container trucks. Further, the RMG may be able to start productive move earlier in the process, i.e., shuffles can already be executed when a truck drives from the gate to the RMG interchange zone on the land side.

At step 502, a container approaches the terminal. As a container approaches, information is provided to the TOS at step 504. This information may include the mission type (drop off, pick up, etc.), a booking number, the trucking company, the date, the driver, and the time. Further, at step 506, a RFID or similar electronic tag on a container truck is identified. The terminal operating service associates the incoming container truck with known information, such as appointments, vessel schedules, etc. Based on this association, instructions are provided for routing the container truck. The container truck travels through a portal at step 508, where it is instructed to either proceed to a container exterior inspection at step 512 or proceed to a driver's assistance area at step 518. At step 510, the portal scans the container identification number, the weight, the license plate, and the dimension and surface images of the container.

If the container truck is directed to the exterior inspection, remote mechanics view images of the container to detect surface damage at step 514. Based on the review, the remote mechanics update the TOS at step 516. The update may include providing information on the condition of the container. Unacceptable containers also may be directed to driver's assistance for resolution of identified issues.

If the container truck is directed to the driver's assistance area, the TOS informs the driver as to the reason for this instruction at step 520. The driver communicates with the gate control personnel to resolve the issues associated with the container truck's access to the gate. If the issues are not resolved, the container truck is refused access and exits the terminal at step 522.

After the exterior inspection, container truck driver identification is confirmed at step 524. The driver is identified to the TOS through biometric information at step 526. Upon successful identification, the TOS authorizes the container truck to proceed at step 528.

As the container truck proceeds, capture seals are applied at step 530, hazardous material identifiers are checked at step 534 and the interior of the containers is inspected at step 538. Remote mechanics, gate clerks and/or the TOS updates seal numbers at step 532. Further, the TOS may provide the ability to update the hazardous material identifiers, as well as record any interior damage to a container.

A ticket is then printed for the container truck at step 540, directing the container truck to a lane for loading and/or unloading of a container. At step 542, the TOS validates a gate check list for a container truck that, upon completion, triggers the ticket printing. This may ensure that a truck does not receive a ticket until complying with all required procedures. At step 544, the ticket printing triggers an RMG work order specifying the particular containers to be obtained.

Truck appointments may be used in the RMG scheduling process to reduce the container truck service time and allow for yard preparation before a container truck is near the terminal. The TOS may include software to automatically set up and execute housekeeping work orders for appointment deliveries prior to the arrival of a container truck. If another container is covering the designated work order container in the same cell, the TOS may initiate the RMG to uncover these container(s) to optimize utilization and make the delivery container more accessible. By way of example, depending on the daily volume, all appointment containers can be stacked in the upper two tiers in the landside part of the stack when an appointment is set a certain time in advance (e.g., at least a day). However, any appointment may facilitate to the organization of the RMG yard.

Different container flows, such as delivery, pick-up, and delivery and pick-up, may be distinguished upon arrival at the gate. For example, when a container truck has to deliver and pick-up a container in the same visit, the system will try to stack the delivery container in the stack module where the pick-up container is located. If that stack has a high workload, and/or if a chassis swap is needed in between the moves, another stack module may be used for the delivery container.

In another example of a multiple container pick-up from two different blocks, regardless of how the TOS schedules the container truck route, the first container to be placed on the container truck chassis will be loaded closest to the container truck cabin. Further, if the remote operator observes an incorrect door direction, the container truck driver may be directed via voice communication at the booth/pedestal to go to the swap line, where the reach stacker will correct the door direction.

When a container is ready in an access zone, the first action may be the assignment of a grounding position. The grounding position may be based on various criteria, such as the discharge port of the container, vessel voyage, the container properties (size, weight), the actual filling rate of each stack module, expected container dwell time, and the workload of the RMG.

The assignment of the container in the stack module may be done at the gate and the driver will receive routing information accordingly. Exceptions may occur if a container truck has to visit another or multiple access locations. At these locations, the intended route may change, end or have another routing issued.

Figure 6:
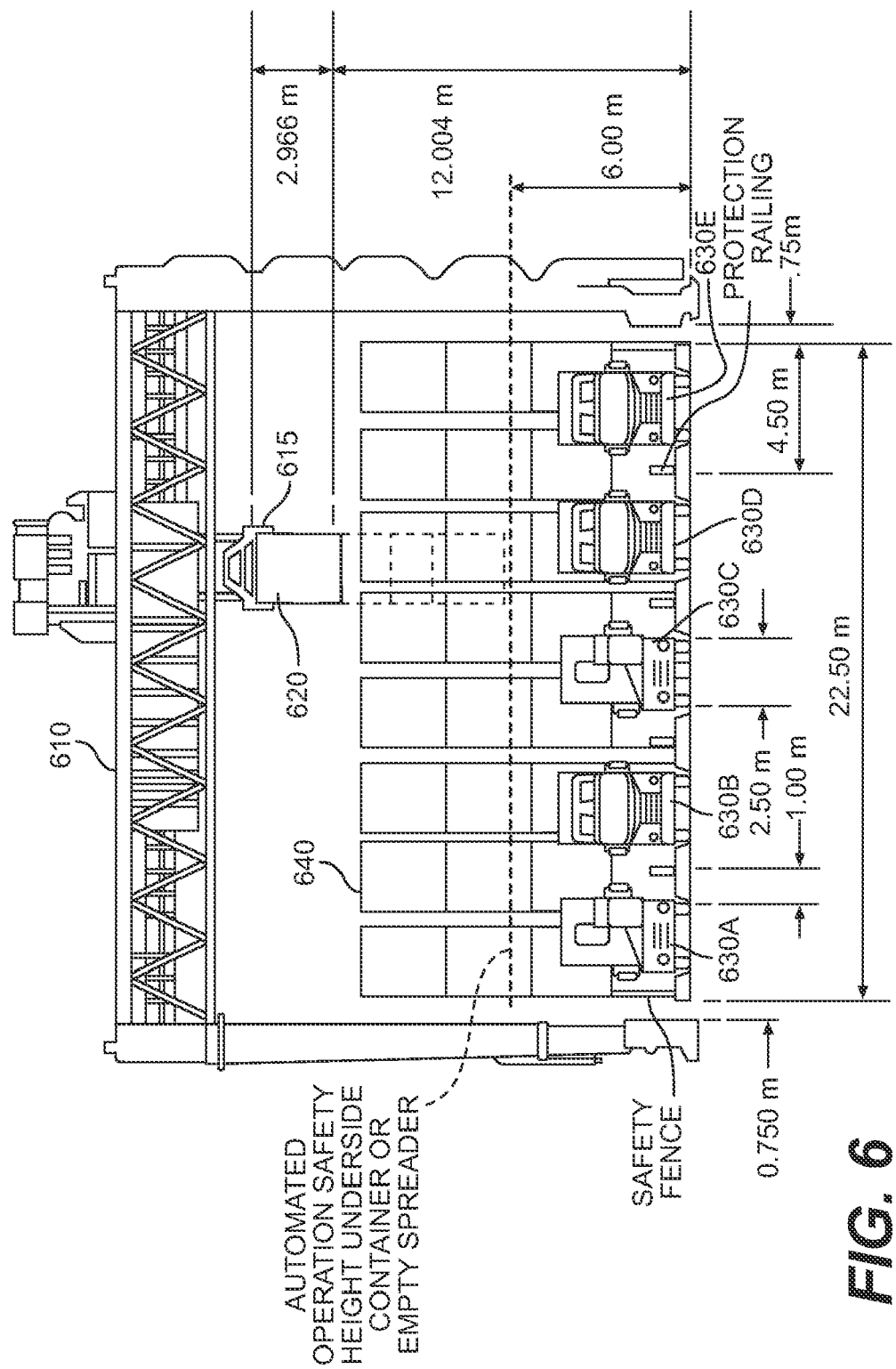
FIG. 6 is a diagram illustrating one embodiment of a landside rail mounted gantry crane ("RMG") at a landside access area of the disclosure.

FIG. 6 is a diagram illustrating one embodiment of a landside rail mounted gantry crane (RMG) at lanes in a landside access point. The RMG 610 is connected to a container using a conventional spreader and is shown lifting a container 620 above five container vehicles 630A, 630B, 630C, 630D and 630E. Vehicles 630A and 630C are examples of intra-facility vehicles (e.g., utility trucks ("UTRs")), while vehicles 630B, 630D, and 630E are over-the-road trucks ("OTRs"). RMG 610 moves the container both horizontally and vertically so that containers may be loaded and unloaded to and from the vehicles 630A-630E. A container stack 640 is shown, with multiple lanes of stacked containers therein. In this example, the RMG 610 spans eight lanes of containers, and services five lanes within the landside access area that are designated for over-the-road vehicle and/or intra-facility vehicle use. For loading/unloading, the over-the-road vehicle or intra-facility vehicle will be backed up into one of the access points of the assigned landside access area.

Each of the access points may have a communication booth and/or a communication pedestal to enable the vehicle driver to communicate with terminal personnel. For example, an intercom system may be installed in the communication booth (pedestal), allowing for two-way communication between driver and process control if needed (i.e., wrong landside access area, wrong container, etc.). The console in the communication booth and pedestal also may have an emergency button. This button may only be used when the driver detects a dangerous situation, sees that the correct container (by number) is not being received or that the container is not properly oriented and may damage the chassis. By pressing the emergency button the motion of the RMG (if in the access area) will be stopped and the intercom line with management/remote operator will be opened to revolve the problem.

Curbs and protection railing separate the access points from each other. The curb will help the driver to position his vehicle correctly. The railing may prevent the driver from accidentally entering an adjacent access point when handling the chassis twist locks (there may be another vehicle moving or the RMG operation may be in progress). The entire landside access area may be fenced against accidental access to the RMG track and stack area.

The remote operator may have images, such as closed circuit television pictures, that oversee the area beneath the spreader 615 of the RMG 610. This allows the remote operator to verify that no personnel are in the area behind or around the cabin of the vehicle or chassis being loaded or unloaded.

Identification may be scanned at the booth/pedestal to identify to TOS that the container truck is at a landside access area. The system will conclude whether that vehicle is at the assigned landside access area or not. The container truck drivers will arrange their chassis and twist locks for the intended exchange. A light mounted at the communication pole may start flashing as a sign that the order is being processed. The driver may be directed by a sign at the communication booth or pedestal to stand clear of the truck so the remote operator can visually ensure the container truck driver is in a safe location. The light may stop flashing as soon as the order is completely processed and the spreader has reached the safety height again. The light will be positioned in such a way that it will also be clearly visible for any vehicle or person that approaches the access point as well as for the remote operator.

Various rules and procedures may be applied and programmed into the TOS and the RMG control to ensure efficient and safe operations. For example, the container truck may pick an empty lane at a landside access area upon arrival. The RMG also may not move sideways to another access point inside the landside access area (trolley travel) when it carries a container in the spreader. After having dropped off a container, the RMG may move sideways with an empty spreader at least at the safety height when an identification is detected by the TOS for container truck have initiated ready for exchange status. In addition, the remote operator may be responsible for ensuring the safety of the container truck driver, as well as the readiness of the container truck for the RMG (e.g., checking the container door). Further, moving a container to and from the landside access area may only be started by the RMG when the driver has provided proper identification. The shuffle moves, that is, the movement of the containers in a stack, may start before this event in order to reduce the service time. Other rules, such as those consistent with the principles of the disclosure described herein, may also be used.

Manual remote operation may be used for some tasks, such as final positioning of RMG moves and problem solving (e.g., re-settable errors, moving broken down RMGs away, support in case the RMG cannot pick-up a container because it is not lined up). In some exceptional situations, manual control of RMGs (inside stack, at waterside access area, or landside access area) may be allowed. As it may be important for the remote operator to react promptly, an alert may be implemented to avoid the RMG waiting for remote support.

Under normal operating conditions, a first RMG crane of each RMG crane pair may service a landside access area while the second RMG crane of each RMG crane pair may service a waterside access area. Both RMG cranes may also service all or part of the pair's container stack, as discussed below. Additionally, an RMG crane may be "parked" within the landside access area or waterside access area by moving the RMG crane away from the end of the container stack to a "parked" location near the outer perimeter of either access area. An exemplary "parked" location 115 is shown in FIG. 3.

Certain events, including but not limited to the breakdown of one of the RMG cranes or a large volume of work at the landside access area or waterside operating area may cause the RMG cranes to operate under special operating conditions. Under these special operating conditions either crane could service either access area. Additionally, both RMG cranes could simultaneously (or near simultaneously) service the same access area together. For example, one RMG crane could service a first access zone within the waterside access area, and the other RMG crane could service a second access zone within the waterside access area.

If one RMG crane malfunctions or becomes inoperable, the other RMG crane may be used to "push" the defective RMG crane to a special location at either end of the track for service, such as the outer "parked" location mentioned above. Once the defective RMG crane has been moved to the special location it may remain parked there until repaired while the other RMG crane continues to service the entire stack and both access areas. The special location may be a part of an access area that is furthest from the container stack.

Figure 7:
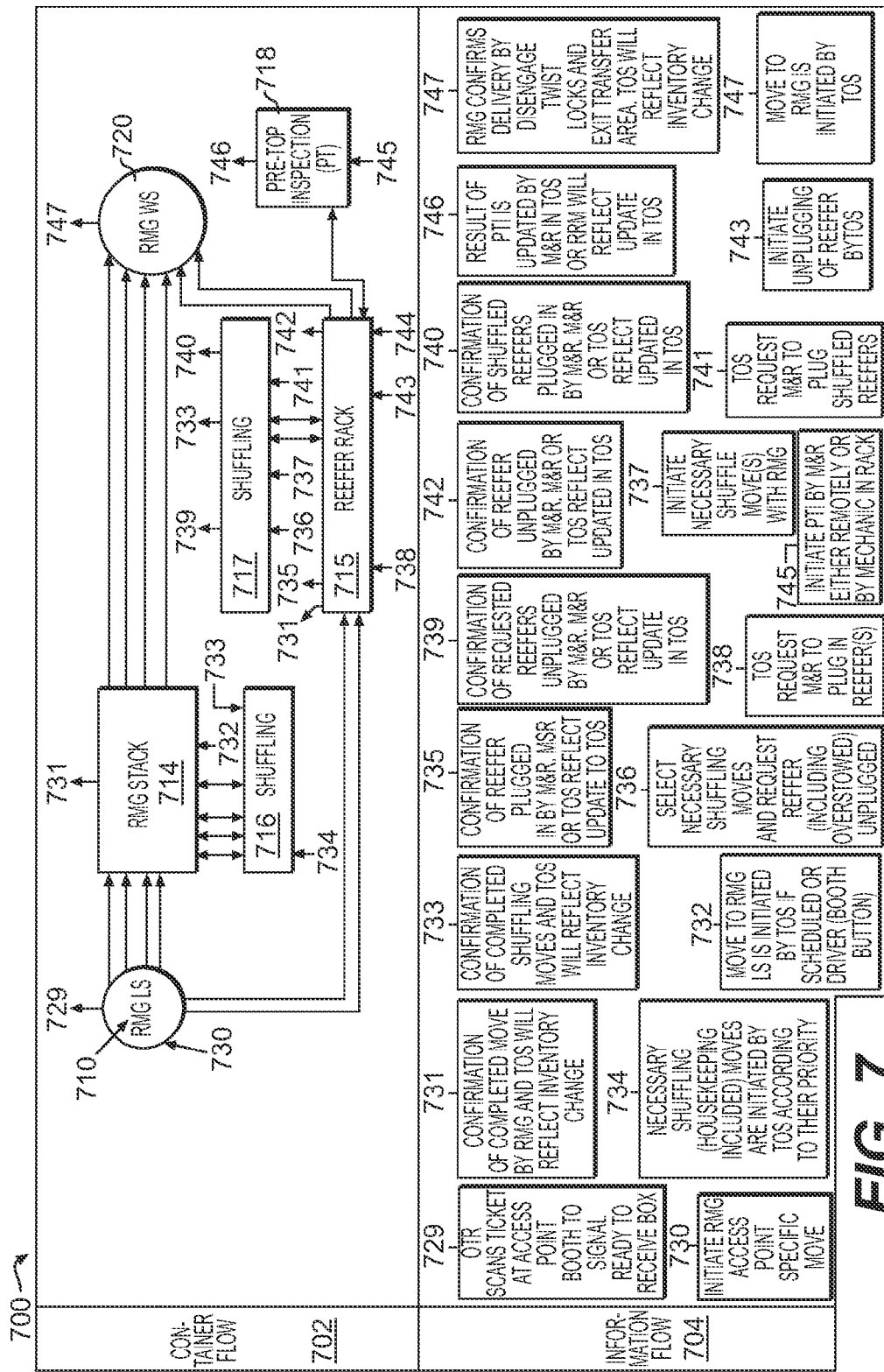
FIG. 7 is a flowchart illustrating one embodiment of container flow and information flow in a container stack in a direction from a land-side to a water-side.

FIG. 7 is a flowchart 700 illustrating an exemplary container flow 702 and information flow 704 through a RMG container stack from landside to waterside. At the RMG landside access area 710, an over the road (OTR) operator scans a ticket at an access point booth to signal the vehicle is ready to receive a container. The signal from the ticket scan is received and processed to initiate a RMG access point specific move 730. An access point specific move is one where a particular container is specified, through various RFID and OCR information about the OTR that was previously captured and recorded, for picking and loading. The RMG picks the container from the OTR and moves the container to an available and/or pre-determined storage spot within the container stack 714. At the end of the move 731, the RMG signals the TOS that the move has been completed. This causes the TOS to update to reflect the inventory change. Thereafter, if scheduled, or in response to a button pushed (or a ticket scanned) by the OTR driver, the TOS may generate signals 732 that instruct the RMG to move back to the landside access area, with or without picking another container from the container stack 714 along the way.

During normal automated RMG operation 734, the TOS specifies necessary shuffling 716 (including housekeeping moves) according to their priority. Shuffling involves moving containers from one part of the stack 714 to another. When shuffling 716 of the container stack 714 is complete, the RMG signals 733 the TOS to confirm completion of the shuffling, which causes the TOS to update to reflect the inventory change.

Reefer moves into, within, and from the reefer rack 715 are similar to other container moves, except that movement of reefers involves additional plugging and unplugging steps. When a reefer is placed within the reefer rack 715, the TOS requests that it be plugged in 738. Thereafter, the reefer is plugged in by maintenance and repair (MR) personnel, and confirmation 735 of the plug-in is manually or automatically passed to the TOS, which records the change.

At times, various reefers stored within the reefer rack 715 may be shuffled. A shuffle move begins by selecting the necessary moves 736 and requesting that specified reefer(s) be unplugged. The specified reefer(s) is/are unplugged by MR personnel, and confirmation 739 of the unplugging is passed to the TOS, which records the change. The shuffling move(s) is/are initiated 737 by the TOS sending a signal to an appropriate RMG that services the reefer rack 715 where the reefer(s) to be shuffled is/are located. Once the specified reefer(s) has/have been moved to its/their new location(s), the RMG signals 733 the TOS to confirm completion of the shuffling. Receipt of the RMG confirmation signal 733 causes the TOS to update to reflect the inventory change. The TOS then requests 741 that MR personnel plug-in the shuffled reefer(s). After the requested plug-ins occur, confirmation 740 that the shuffled reefer(s) have been plugged-in is transmitted to the TOS, which records the change.

Before a reefer can be moved out of the reefer rack 715, a pre-trip inspection (PTI) 718 must be initiated 745 either remotely or by a mechanic working the reefer rack 715. The result 746 of the PTI 718 is uploaded to the TOS either manually by MR personnel or remotely using the remote reefer monitoring, which enables 2-way communication from a central console to/from individual reefers. Thereafter, the TOS initiates unplugging 743 of the specified reefer. Confirmation 742 that the selected reefer has been unplugged is manually or remotely transmitted to the TOS, which records the change. The TOS then instructs an appropriate RMG to move 744 the specified reefer to a waterside access area or a landside access area 720. The RMG confirms delivery 747 of the specified reefer (or container) by disengaging the twist locks and exiting the access area. When the RMG delivery confirmation signal 747 is received, the TOS updates to reflect the change.

The operation of RMGs may occur under appropriate computer control and implementing software as follows. First, the order information should be made available to the RMG schedule as soon as the order is known (also containers to and from the inspection area (INS) and the MR area should be planned in advance and relayed to the TOS, which issues the orders to the RMG-Management System). The earlier receipt of information may facilitate improved reaction time, and the minimum time equals the reaction time of the RMG Management System (RMG-MS), which may be about 10 minutes during quiet times and 15 minutes during peak hours. In addition to actual move information, it is necessary for the terminal operating system to be informed regarding the future destination of the container, i.e., the carrier mode specifics regarding how the container will exit the terminal (vessel, barge, truck, rail). Also, the timing with regard to these modes (for instance the arrival/departure time of the train with which the container will leave the terminal) may be important to supply to the TOS. The same timing principle holds for container(s) that gate in and gate out. For example, it is important to know whether the driver will visit a reefer service area (RSA), CSA, or other areas. Such information is used to prioritize moves within the RMG schedule.

The RMG Management System, which is a component of the Terminal Operating System (TOS), maintains an overall order list containing all moves that are known. Out of this order list, order lists for each RMG module (e.g., one stack with two RMGs) are derived. These lists are transformed in real-time into work order(s) for each of the RMGs. When a RMG does not receive a work order within a certain time window, it may execute moves that will shorten later moves that are already known at that point in time, i.e., pre-positioning and housekeeping moves.

The process flow of creating a schedule for an RMG may involve at least the following steps. First, all relevant known movement information is gathered. This information may include all kinds of moves, including moves to RSA, INS, and CSA among others. When the moves are within a certain time frame (one-two hours) and already assigned to a specific stack module (or originating from a specific stack module) the moves are scheduled, which means that an actual move instruction is created. Also, the shuffles required to perform this move are created in the work order. Discharge moves that have not been discharged yet (and therefore, do not have a stack module assigned yet) cannot be transformed into instructions until they have been physically discharged. However, the information about the known discharge moves can be used for deciding in which stack module to put each container.

The moves are added to an overall order list (overview of pending instructions within the TOS), and divided among the stack modules. In one embodiment, only moves that have already been assigned to a stack module are considered. The RMG Management System then schedules the moves in real-time, so as to fulfill the due time of each move. The RMG schedule is consulted every time an RMG is ready with a job. Then, all moves that are executable are evaluated on priority, and the one with the highest priority is executed.

Information for organizing the RMG internal process may include berthing information (which vessel will berth where) upon planning, load lists (which container will sail with which vessel and when), train schedules, train load list (which container will go with which train), information from truck appointment systems which may contain the container that will be brought/pick-up as soon as the information is known in the TOS, other moves (Inspection, MR) to be executed by the RMG, as early as possible, reefer moves upon scheduling, truck arrivals (upon arrival at the gate), planned maintenance of RMGs and civil works (i.e. terminal facility maintenance) upon scheduling, and corrective maintenance upon notification.

Additional information relevant for the RMG operation may include a voyage number, an estimated time of departure, a weight (weight class), a container size, a port of destination, a container statuses (hold or released), whether a chassis swap is needed, the estimated time of departure (e.g. schedule train, appointment), a customer (this may be relevant for block storage in the yard), the mode of transportation (barge, road, rail) for segregating in the yard, and a connecting mode (vessel voyage number, train identification).

The RMG container stacks may be user configurable, and capable of accommodating 20', 40', and 45' containers. The RMG Management System evaluates and determines placement and stacking (height) of containers within the stack.

Containers of the same type, i.e., same voyage, same port-of-discharge (POD), same size, same weight class, may be stacked on top of each other. The TOS allocates similar containers, but does not overload one stack with a single POD, which would negatively affect vessel production. Stacks of similar containers are spread out over the stack modules behind the berth of destination. This enables the TOS to pick boxes from the top upon loading. However, it also limits the flexibility within the yard, i.e., similar containers may not always be found, and there may be no free ground slots available. The TOS and the RMG-MS work together to manage the rules that govern placement of containers within a stack, but manual intervention of yard planners is also possible.

Figure 8:
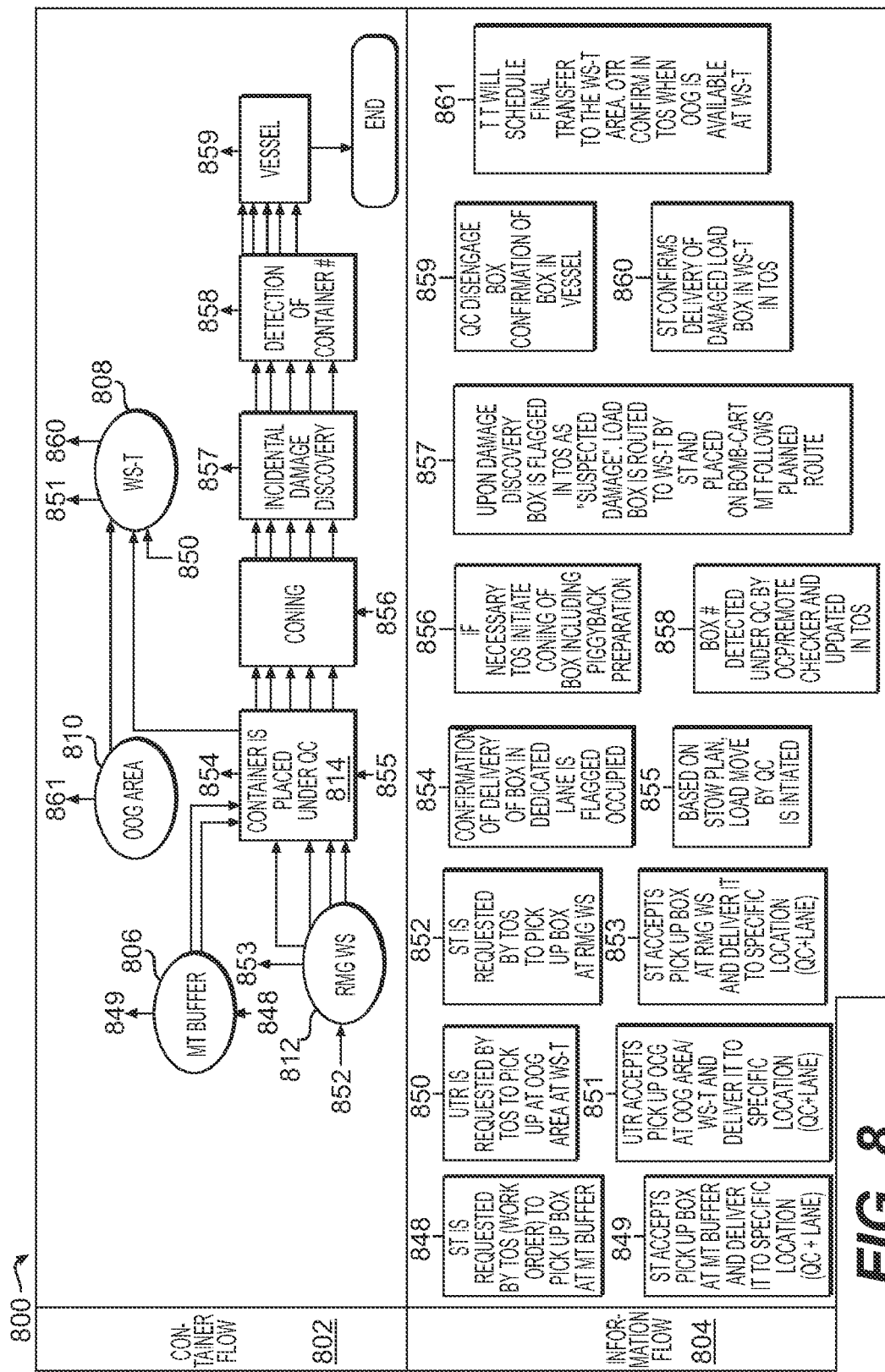
FIG. 8 is a flowchart illustrating one embodiment of container flow and information flow from a container yard to a container ship.

FIG. 8 is a flowchart 800 illustrating an exemplary container flow 802 and information flow 804 from an RMG yard to a container vessel. Illustratively, the process may begin when the TOS requests a specified waterside shuttle truck (ST) to retrieve a specified container from the Empty Buffer area 806. The ST accepts 849 the specified container at the Empty Buffer area 806 and delivers it to a location specified by the TOS.

Alternatively, the process may begin by the TOS requesting 850 a utility truck (UTR) to pickup a container at a designated waterside temporary area (WS-t) 808 or out-of-gauge (OOG) area 810. The UTR may accept 851 to pick up a container at the WS-t area 808 and deliver the container to a location specified by the TOS. As indicated by process 861, the terminal transfer department will schedule the final transfer of a container to the WS-t area (or other area). Additionally, the UTR will confirm in the TOS when the OOG container is available at the WS-t.

Alternatively, the process may begin when the TOS requests 852 a ST to pickup a specified container at the RMG waterside access area 812. As indicated by process 853, the ST picks up the specified container and delivers it to a location specified by the TOS.

If the location specified by the TOS is under the quay crane, as indicated by block 814, the ST confirms delivery 854 of the container in a dedicated service lane, and the lane is automatically flagged as being occupied. The ST places the container on an identified area of pavement (such as the ground, a stow pillar, or other designated area, and notifies the TOS, which initiates a load move 855 by the quay crane or RMG. If necessary, the TOS may initiate coning 856 of the container, including piggybacking the container onto another previously positioned container(s). Coning, which involves inserting of a double-ended male twist lock into the corresponding female receptacles formed at each corner of the containers, may be performed in a coning station area.

In one embodiment, the container is scanned for damage, using OCR, as it enters the service lane and/or is placed on the stow pedestal. If damage is detected 857, the container is "flagged" in the TOS as "suspected damage", and the container is routed to the WS-t either by a ST or a UTR and placed on a "bomb-cart", which is a flatbed trailer used to deposit a container without the use of twist-locks to secure the container to the cart. A "bomb-cart" often proves useful in moving damaged containers that cannot be secured by twist-locks. As indicated by process 860, the ST/UTR confirms delivery of the container to the WS-t to the TOS, which records the change. Otherwise, OCR systems installed on or near the quay crane detect the container number 858, and upload this information to the TOS.

Thereafter, the quay crane loads the container aboard the vessel. Once the container is aboard, the quay crane disengages 859 from the container, and confirms to the TOS the delivery of the container to the vessel.

According to one embodiment of the disclosure, the portions of the stack serviced by the RMG waterside may be used as temporary buffer. For example, each of the waterside access areas may be four 20' containers deep (to allow for a continued operation even in the case of an RMG breakdown).

As mentioned above, an access area is a location at the landside end or the waterside end of a container stack that is used for loading and unloading containers. Access areas may be made up of access lanes, access points, and access zones. Access lanes are portions of an access area that can be occupied by intra-facility or OTR vehicles and that extend generally parallel to the longitudinal dimension of the container stack ("longitudinal direction"). Each access lane includes one or more adjacent access points extending in a longitudinal direction of the lane. Access points in reality are particular spots within an access lane where a container is transferred. Access zones are collections of generally adjacent access points spanning across and generally perpendicular to the width of the access lanes that can be used to form a level of buffering, as discussed below.

Figure 12:
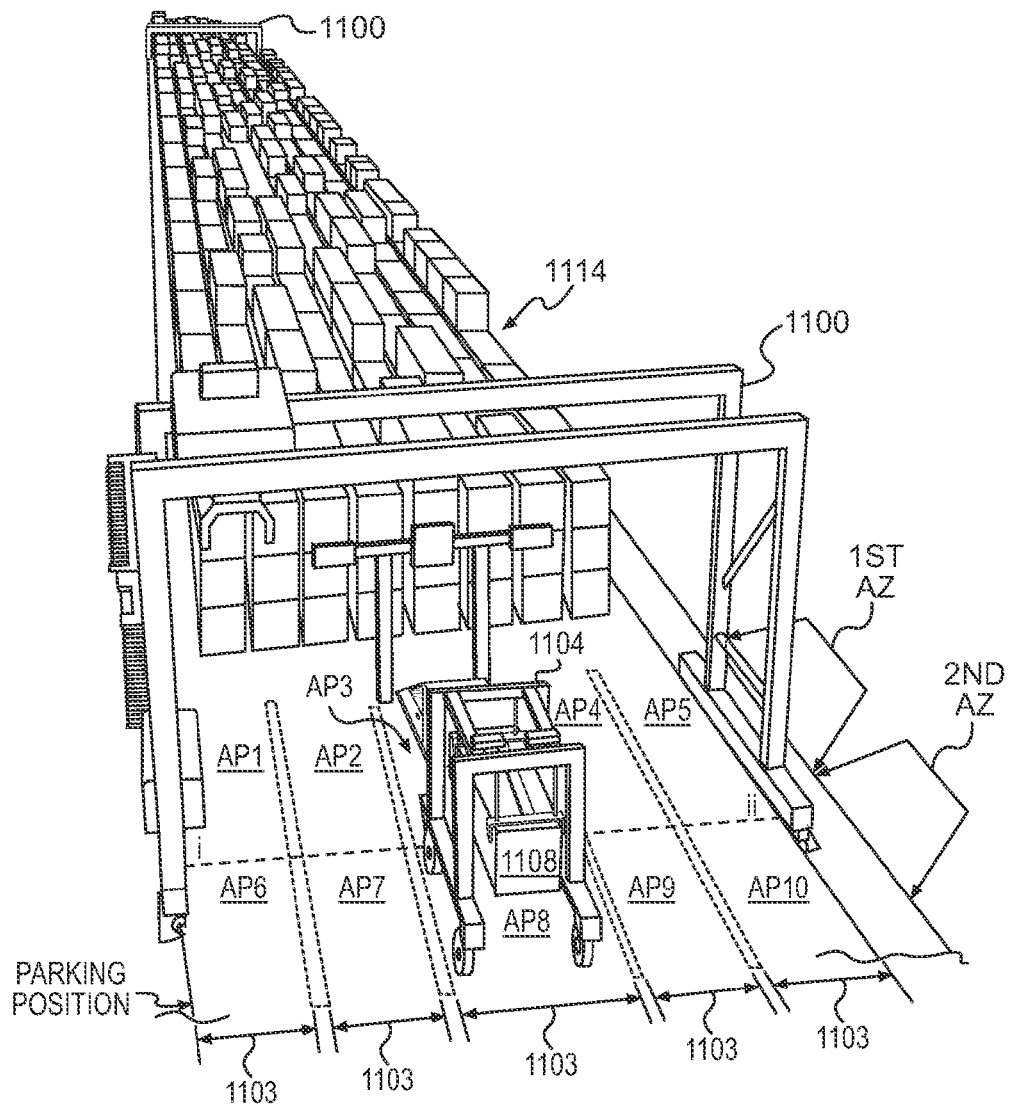
FIG. 12 is a perspective view of the yard of the container handling facility of FIG. 1 looking from a water-side vantage point towards the land-side.

In particular, as shown in FIG. 12, each waterside access area may include several access lanes 1103 that have shared wheelpaths, and that extend in the longitudinal direction from the end of the container stack 1114. Each access lane 1103 may include one or more access points ("AP"), which are spots for loading and unloading containers. In FIG. 12, an access lane 1103 illustratively includes two access points, and a horizontal dotted line i-ii represents the access area's horizontal axis. The plurality of first access points (AP1, AP2, AP3, AP4, and AP5) are located above the dotted line i-ii, and the plurality of second access points are located below the dotted line i-ii (AP6, AP7, AP8, AP9, and AP10). A first access zone (1st AZ) includes all of the first access points (AP1, AP2, AP3, AP4, and AP5) that extend across a width of the access area 1120 closest to the container stack 1114. A second access zone (2nd AZ) includes all of the second access points (AP6, AP7, AP8, AP9, and AP10) that extend across the width of the access area furthest from the container stack 1114.

The access points of landside and waterside access areas may be used as temporary storage locations to provide buffering of containers. Considering a waterside access area for example, export containers that will be picked-up by a ST within a short time period may be temporarily stored at a second access point. In one embodiment, at the access area itself, ten (10) forty-foot equivalent units (FEUs) may be placed in the case of load and even 16 FEUs upon discharge. However, there will usually be a mixed operation combining loading and discharge. If possible, an entire waterside access area should not be occupied with discharge containers because this would block a possible future load (export). However, portions of each waterside access area may be used as permanent storage in peak periods. As long as one access point within each waterside access area is kept available, operations may be able to continue even when breakdowns occur. Containers loaded into stack buffering at the waterside access areas may be stacked two high. Discharge containers, however, may be loaded into the container stack in a random sequence (as long as the RMG Management System knows where each container is loaded). Within each waterside access area, containers may be piled as high as the ST permits.

The TOS should evaluate and plan the accessibility of containers located at any of the first access zones within each waterside access area. For instance, if a container offloaded from a landside vehicle (e.g., an export container) is positioned at the first access zone (e.g., close to the container stack), it may not be accessible if two containers offloaded from a ship (e.g., import containers) are piled in front of it at the second access zone (e.g., located between the export container and the waterside). Thus, one rule may be to place export containers at the second (closest to the waterside) access zones, whereas import containers should be placed at the first (inner) access zones.

Figure 9:
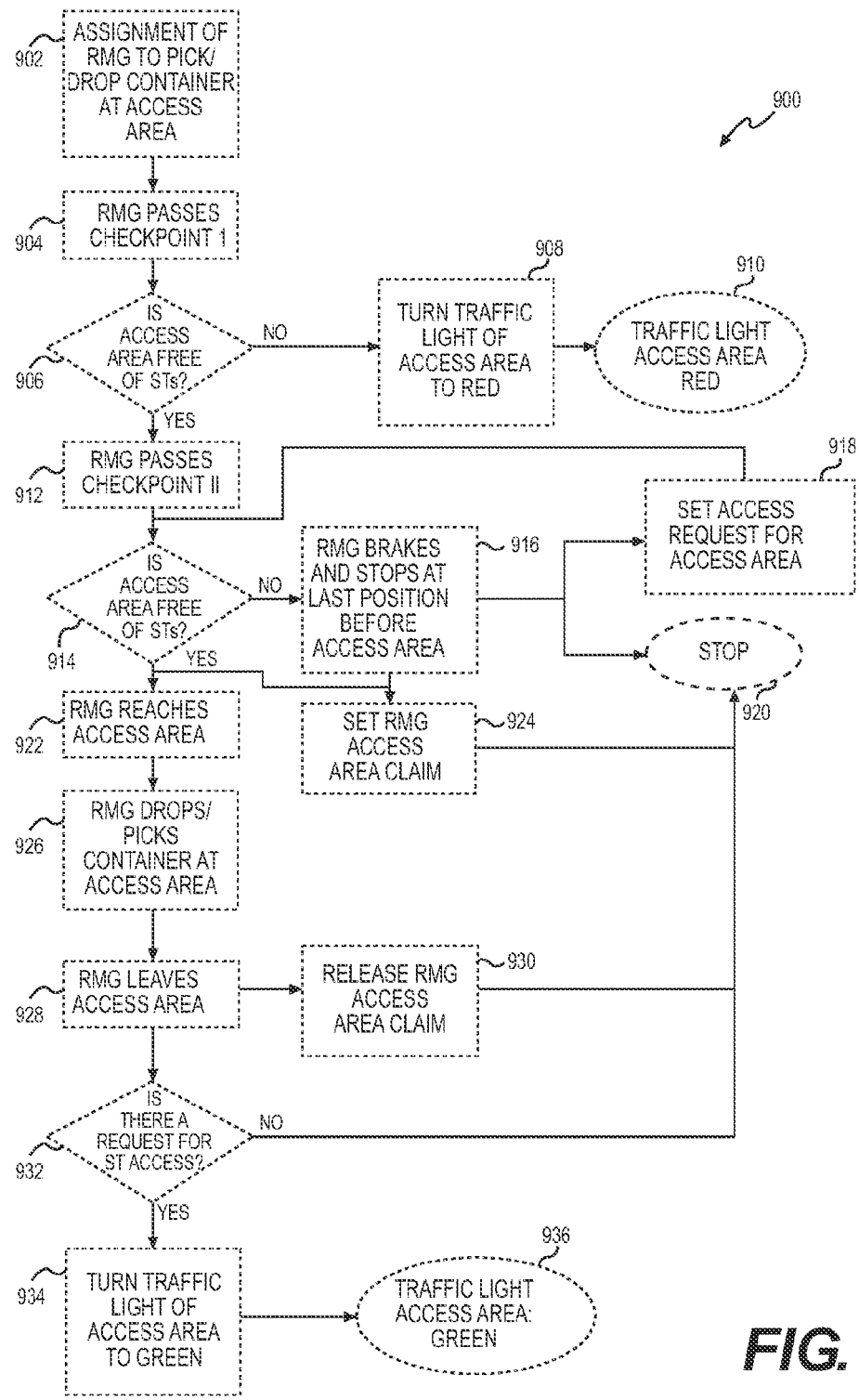
FIG. 9 is a flowchart illustrating an exemplary regulated access process used to operate an automated RMG along a container stack.

FIG. 9 is a flowchart 900 illustrating a regulated access system usable with a RMG. The regulated access system may assist in collision avoidance, as well as regulating and controlling access by shuttle trucks ("STs") to various points within the terminal. The process may begin when an RMG is assigned 902 to pick/drop a container at a landside or waterside access area. Using a waterside access area as an example, the RMG passes 904 a checkpoint enroute to the waterside access area, which notifies the TOS of the RMG's position. As the RMG approaches the waterside access area, it senses 906, using laser or other types of sensors, whether the access area is free of STs. If the waterside access area is not free of STs, a signal is issued that turns 908 traffic lights positioned near the access area to red. The traffic light remains 910 red until either the entire access area (or lanes adjacent to a lane designated by the TOS for loading/unloading) is free of STs.

If the waterside access area is free of STs, the RMG may pass 912 another checkpoint, and again scan 914 the waterside access area for the presence of STs. If one or more STs are detected within the waterside access area (or within lanes adjacent to the lane designated by the TOS), the RMG brakes 916 and stops at the last position before the lanes. Thereafter, the RMG either stops 920 or requests access 918 to the waterside access area from the TOS. If access is granted, the RMG again scans 914 the waterside access area.

If the waterside access area is free of STs, the RMG reaches 922 the specified access point, and/or initiates 924 a claim to the access point. If the access point claim is successful, no STs will enter the waterside access area until the RMG claim is released.

The RMG drops/picks 926 the specified container at the specified access point. Once the drop/pick operation has been performed, the RMG leaves 928 the waterside access area, and may release 930 its claim to the waterside access area. Thereafter, if a ST requests access 932 to the waterside access area, the request may be approved as the traffic light turned 934 to green 936.

In one embodiment, the RMG will claim the waterside access area for only a short period of time in advance of approaching the access point (e.g., at the first checkpoint). This avoids unnecessary waiting by the STs. When the RMG claims the waterside access area, the system checks whether a claim is already granted to a ST. If not, the claim is provisionally granted to the RMG and the traffic light will be set red. At the second checkpoint, the claim may be finally granted to the RMG, if in the meantime, no ST has interfered (because there may be some reaction time to the traffic light turning red). With regard to the ST, the period between checkpoint I and II can be compared with the "yellow" period of a traffic light (for example the "yellow" period may be set at 5 seconds). If during this "yellow" period one of the access points is claimed by a ST, then the claim will be granted to the ST and not to the RMG. If the "yellow" period expires without any ST claim then the claim of the RMG will be granted to the RMG.

If a claim is granted to the RMG and coincidentally a ST enters the waterside access area (ignoring the red light), the RMG will "freeze" its movements. The RMG will apply for a new claim and will proceed to/on the waterside access area only after such claim is granted again according to the new situation.

Figure 10:
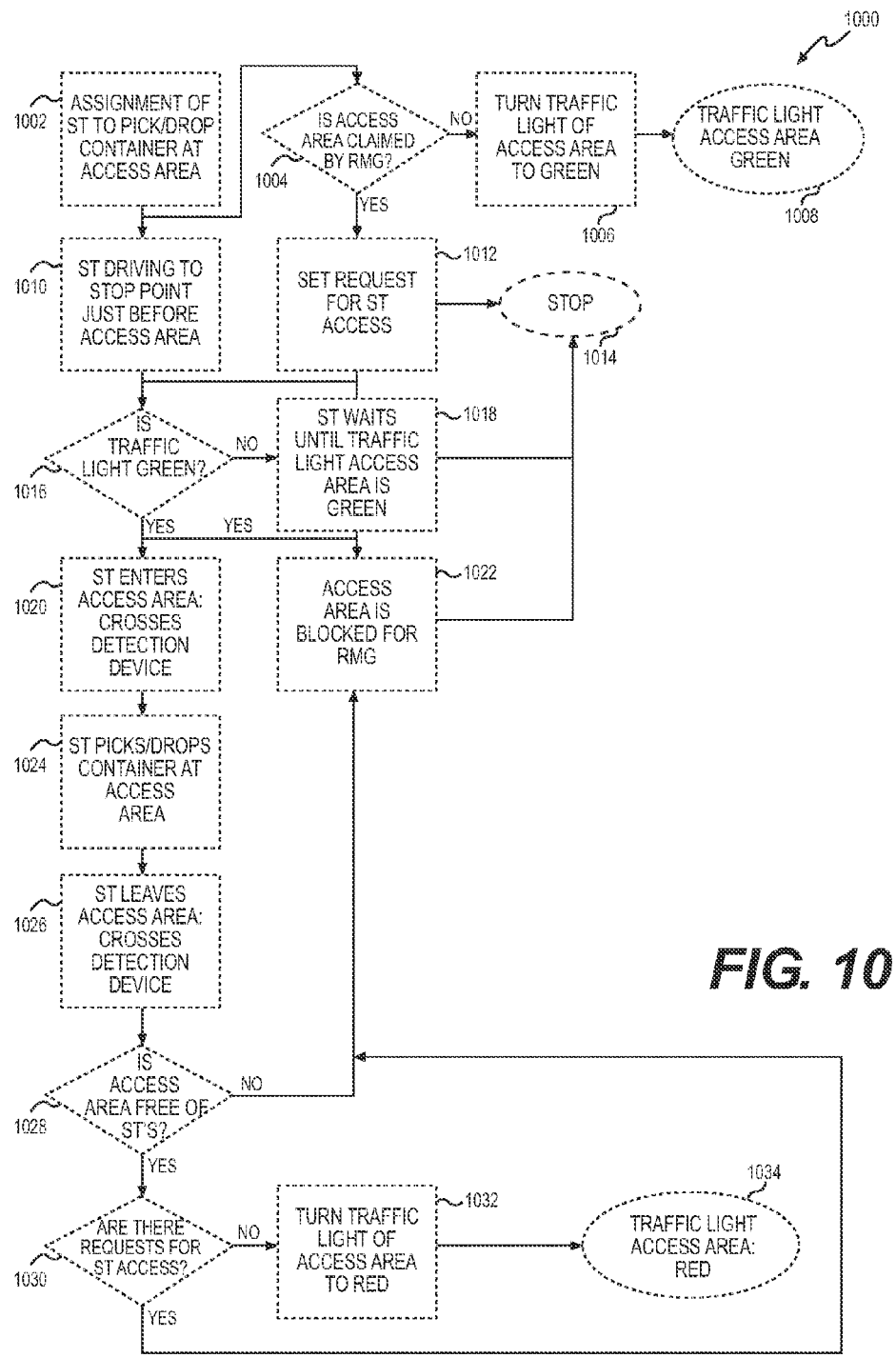
FIG. 10 is a flowchart illustrating an exemplary regulated access process that may be used to operate a non-automated shuttle truck ("ST") between a quayside access point and a waterside access area.

FIG. 10 is a flowchart 1000 illustrating an exemplary regulated access process that may be used by shuttle trucks (STs). The process may begin when a ST is assigned 1002 by the TOS to pick/drop a specified container at a particular access point located within a waterside access area. When approaching the waterside access area, the ST checks 1004 to determine whether the waterside access area is claimed by a RMG. If the waterside access area is not claimed by an RMG, the TOS turns 1006 the traffic light of the waterside access area to green 1008. If the waterside access area is claimed by an RMG, the ST requests 1012 access to the waterside access area and stops 1014 operation until access is granted.

Otherwise, the process continues as the ST drives 1010 to a stop point located just before the waterside access area. At the stop point, the ST checks 1016 to see whether the traffic light is green. If the light is not green, the ST waits 1018 until the light turns green.

If the light is green, the ST enters 1020 the waterside access area, and in doing so, moves past a waterside access area detection device. Once the detection device senses the presence of the ST, the waterside access area is blocked 1022 for the RMG (e.g., the RMG waits until the ST clears the waterside access area).

The ST then picks/drops 1024 its container at the specified access point. As the ST leaves 1026 the waterside access area, it passes the waterside access area detection device. The detection device scans 1028 the waterside access area to determine whether the waterside access area is free of STs or not. If not, the waterside access area is blocked 1022 for the RMG. Otherwise, the TOS checks 1030 to see whether there are pending requests for ST access. If no ST requests are pending, the TOS turns 1032 the traffic light of the waterside access area to red 1034. If requests are pending, the TOS may block 1022 the waterside access area for the RMG.

In one embodiment, a work order is sent to a ST driver from the moment that a waterside RMG places the container(s) on a designated access point and releases the twist locks. Although the ST work order is ready, the ST may not execute the work order until the RMG has left and released the claim for the waterside access area.

In one embodiment of the disclosure, a work order for a discharge container is executable for the ST driver(s) as soon as the container is grounded under the quay crane and the identification procedure has been completed. Further, the ST driver may receive the destination (RMG module and waterside access area number) as soon as the driver has accepted to execute the order. At that moment, the TOS will turn the traffic light of the specific waterside access area to green (if the waterside access area is not already claimed by the RMG). However, this will not mean that the ST has already claimed the waterside access area. The light will stay green as long as the RMG does not claim the waterside access area, during the time needed by the ST to reach the waterside access area.

When the ST driver is close to the waterside access area, the driver will check the color of the traffic light. If green, the driver may proceed and enter the assigned access point within the designated waterside access area. If red, the driver will wait until the waterside access area is no longer claimed by the RMG. This may be an important procedure to follow because the RMG may still be approaching and therefore not clearly visible or may already be at the waterside access area.

The ST may actually claim the waterside access area as soon as the ST is detected by the TOS system to be located proximate the waterside access area (e.g., before the ST actually moves onto the waterside access area). From that moment on, the RMG will be denied any claim request until the system has established that there is (are) no ST(s) at the waterside access area.

If a ST accidentally enters a red-light waterside access area, the ST driver will receive a signal and message via the TOS that he is supposed to leave the waterside access area. The potential for collision between RMG and ST is small because the RMG spreader (and load) is in the highest position, thus allowing ample time for the ST driver to move away from the waterside access area.

Figure 11:
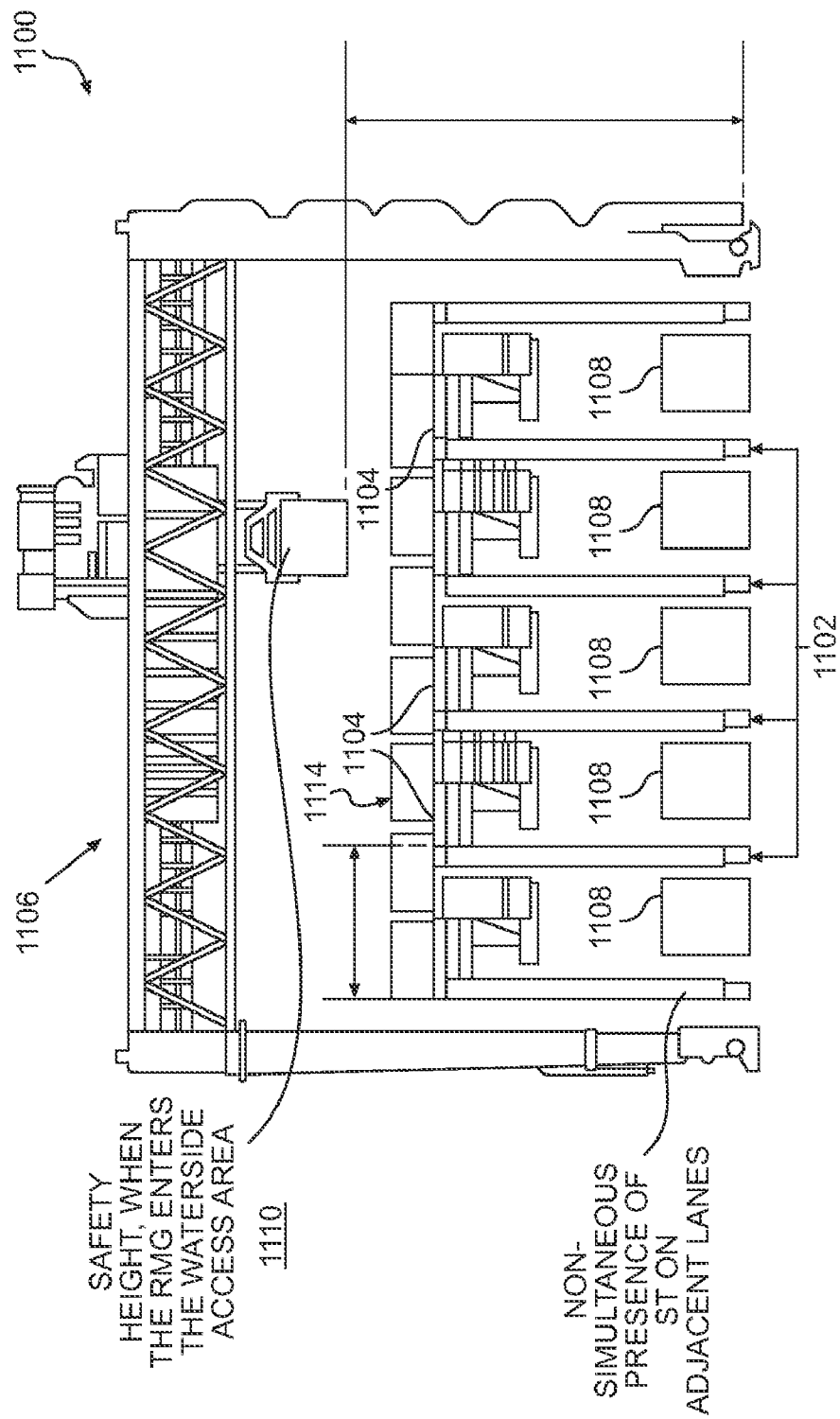
FIG. 11 is a diagram illustrating an exemplary embodiment of waterside access area illustrating the interface between a RMG and a ST.

FIG. 11 is a diagram illustrating one embodiment of a waterside access area 1100, having five shared wheelpaths 1102 for the shuttle trucks (STs) 1104, which may park at one or more designated access lanes within the waterside access area 1100. (FIG. 11 shows all five ST's positioned under RMG 1106 for purposes of illustration only, as explained subsequently.) The RMG 1106 picks/drops containers 1108 to/from the container stack 1114 and the waterside access area 1100. When moving a container 1108, the RMG hoists it to the maximum height 1110, so as to clear the container stack 1114 and/or any STs 1104 that may have inadvertently strayed into the waterside access area 1100.

For a container stack 1114 that is illustratively eight containers wide, five access lanes (each four containers deep) may be included within the waterside access area 1100. The access lanes are structured such that wheelpaths 1102 between the containers 1108 may be shared by the STs 1104. Thus a maximum of three STs 1104 may operate within the waterside access area 1100 at the same time. Thus, the shared wheelpaths 1102 permit the non-simultaneous presence of STs 1104 on adjacent access points. Stated differently, two STs 1104 cannot access adjacent access points at the same time. Of course, other configurations are possible, as the skilled artisan will recognize.

If the RMG 1106 has its spreader in the highest position 1110, the spreader (or the container) cannot physically touch a ST 1104, even if a ST 1104 and the RMG 1106 were in the waterside access area 1100 at the same time. This characteristic is a safety feature, so that even in case of a mistake, a mismatch of information or a misinterpretation of the signals by the ST driver (traffic light, audio and visual signals in the cabin), the ST 1104 may still have ample time to leave the waterside access area 1100 if needed. In such case, the RMG 1106 automated failsafe controls will "freeze" the RMG 1106 movements. The RMG 1106 will be unfrozen soon as all STs 1104 have left the waterside access area 1100.

Further, a positioning system for the STs 1104 may be used to ensure proper alignment of the grounded containers in both directions. A traffic light system (not shown) may be installed, controlled by TOS, to avoid simultaneous access of STs 1104 and the RMG 1106 at the waterside access area 1100. A detection system (not shown) may be installed within or proximate the waterside access area 1100 to register movement of a ST 1104 to/from the waterside access area 1100.

In one embodiment, the following important rules may be implemented in software in the TOS and apply to the interaction of STs 1104 and RMGs 1106 at the waterside access area 1100.

The ST driver should confirm the acceptance of a job. The information on the display of a remote data terminal (RDT)

proximate the driver will show the exact RMG access point (slot specific) within a pre-determined waterside access area for where the specified container is to be picked/dropped. In one embodiment of the disclosure, the traffic lights of the pre-determined waterside access area may immediately turn to green, if not claimed by the RMG. Otherwise, the lights will turn to green as soon as the RMG's claim to the waterside access area is released.

An RMG 1106 delivering an export to the waterside access area 1100 should claim the second access point within the designated lane (e.g., the access point that is closest to the water). The ST 1104 approaching the waterside access area 1100 should claim the first access point closest to the RMG stack 1114. This will reduce the potential conflict of a ST 1104 being blocked by having to remove an export over two containers that had been placed in the second access point.

During the approach movement of the RMG 1106 to the waterside access area 1100, there may be two checkpoints at which the control system may decide to alter the RMG's approach. The positions of the checkpoints may vary, depending on the rate at which the RMG 1106 is traveling. Checkpoint 1 should be designated at such a distance that, if not interfered, the RMG's approach will continue smoothly as scheduled. The second checkpoint may be set at such a distance that, if needed, the RMG 1106 can still stop (in a normal manner) at the last position just before the waterside access area 1100.

The RMG 1106 may be programmed to enter the waterside access area 1100 with the spreader/container in the highest position and lined up to the proper access point in relation to the order being executed. This ensures that the RMG 1106 will not move side ways (trolley travel) in the waterside access area 1100 when it carries a container 1108 in the spreader.

After having placed a container 1108 on the designated access point, the RMG 1106 will again hoist to the highest position, and may move (trolley) the empty spreader side ways to another access point of the same waterside access area to pick up another container 1108. In such case, the RMG 1106 will have already claimed the waterside access area, and there should not be any STs 1104 in the waterside access area 1100. Because the RMG 1106 is clearly visible, the danger of an accidental mistake by a ST driver entering that same waterside access area at that time is minimal.

When a ST 1104 is entering an access point within a waterside access area, the TOS system will check whether the ST 1104 is at the right or wrong access point. If the ST 1104 attempts to enter the wrong access point, the ST driver will be warned by the system (audio and/or visual signal in the cabin) and should not release/pick up the container 1108 at that access point. However, in the case of certain exceptions, the ST may still be able to release/pick up a container. This process ensures the integrity of the container information (e.g., which container is where) and positively influences the cycle time of the RMG 1106.

If a ST 1104 ignores the waterside access area safety lights, and enters the waterside access area 1100 after the RMG 1106 is already within the waterside access area 1100, the spreader of the RMG 1106 will automatically freeze. Laser sensors mounted overhead, 1102 may be used as a secondary safety mechanism to detect the presence of multiple STs 1104 in the waterside access area 1100. In another embodiment, the secondary safety mechanism may include proximity sensors, mounted in the pavement underneath where the ST wheel-paths are located. As an added precaution, a large siren may sound to alert the ST operator they are in a danger zone. An alert may also sound in the ST cab and on the ST RDT.

Additionally, an alarm may also sound in the Assistant Operations Manager office and in the dock foreman's office or RDT.

FIG. 12 is a perspective view depicting the RMG, ST, waterside access area, and container stacks of FIG. 11. As described above, FIG. 12 illustrates an exemplary arrangement of access lanes, access points, and access zones within a waterside access area.

Figure 13:
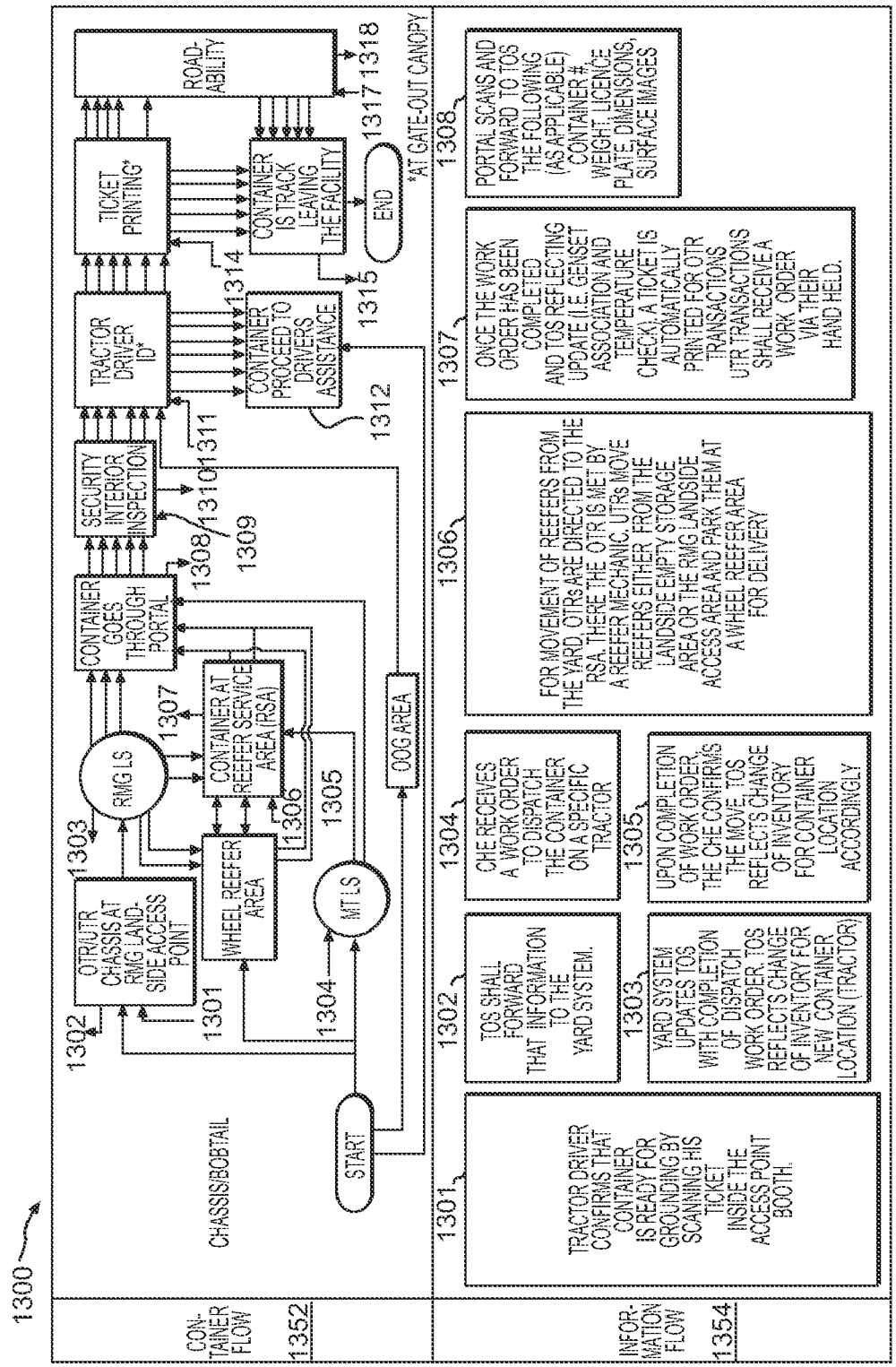
FIG. 13 is a flowchart illustrating an exemplary container flow and information flow from the yard to an exit gate.

FIG. 13 is a flowchart 1300 illustrating an exemplary container flow 1352 and information flow 1354 from the stack yard to an out-gate. The process may begin when the TOS detects at 1301 a specific landside access area lane and tractor combination, and associates that information with pending gate work. Additionally, the tractor driver may confirm that the container is ready for grounding by scanning his trip ticket inside the safety booth positioned at each lane within the landside access area. The TOS then confirms and forwards 1302 the detected information to the yard system.

The yard system then updates 1303 the TOS with completion of dispatch work orders, and the TOS reflects the change of inventory for the container's new location (e.g, on the tractor chassis). The container handling equipment (e.g., RMG-LS) then receives at 1304 a work order to dispatch the container onto the specific tractor. Upon completion of the work order, the RMG-LS confirms at 1305 the move, and the TOS records the change in inventory.

For movement of reefers from the yard (1306), OTRs are directed to the RSA. The OTR driver is met by a reefer mechanic who will service the OTR. Terminal utility trucks (UTRs) with quick will move reefers from either the landside empty storage area or the RMG landside access area and park them at a wheel reefer area for delivery.

Once the work order has been completed at 1307, the TOS is updated to reflect the change. A ticket may be automatically printed for OTR transactions. UTR operators may receive work orders via a handheld device.

In passing out of the RMG landside access area, the container passes through a portal at 1308 that scans the container/tractor and forwards to the TOS information that may include, but is not limited to, container number, weight, license plate number, container dimensions, images of the container's surfaces, and similar information.

Thereafter, the container and tractor may be routed at 1309 for an interior security inspection 1310 by customs or terminal personnel. The interior inspection may be performed manually, or remotely, using OCR and associated technologies. If the container passes the security inspection, the identification of the tractor driver may be verified at 1311 using biometrics and/or other identifying information. Otherwise, the container is held until releised from the security inspection station.

If the TOS detects any issue with the completed visit information (e.g. damaged container) the driver may be routed at 1312 to the driver's assistance area. Otherwise the driver may proceed at 1314 to a ticket printing terminal, which checks at 1315 whether the container is permitted to leave the facility. If so, the container, tractor and chassis may be subjected at 1317 to a roadability inspection. If the roadability inspection is passed, the container is routed to the out-gate. Otherwise, the OTR is detained 1318 (or routed to a maintenance area).

Figure 14:
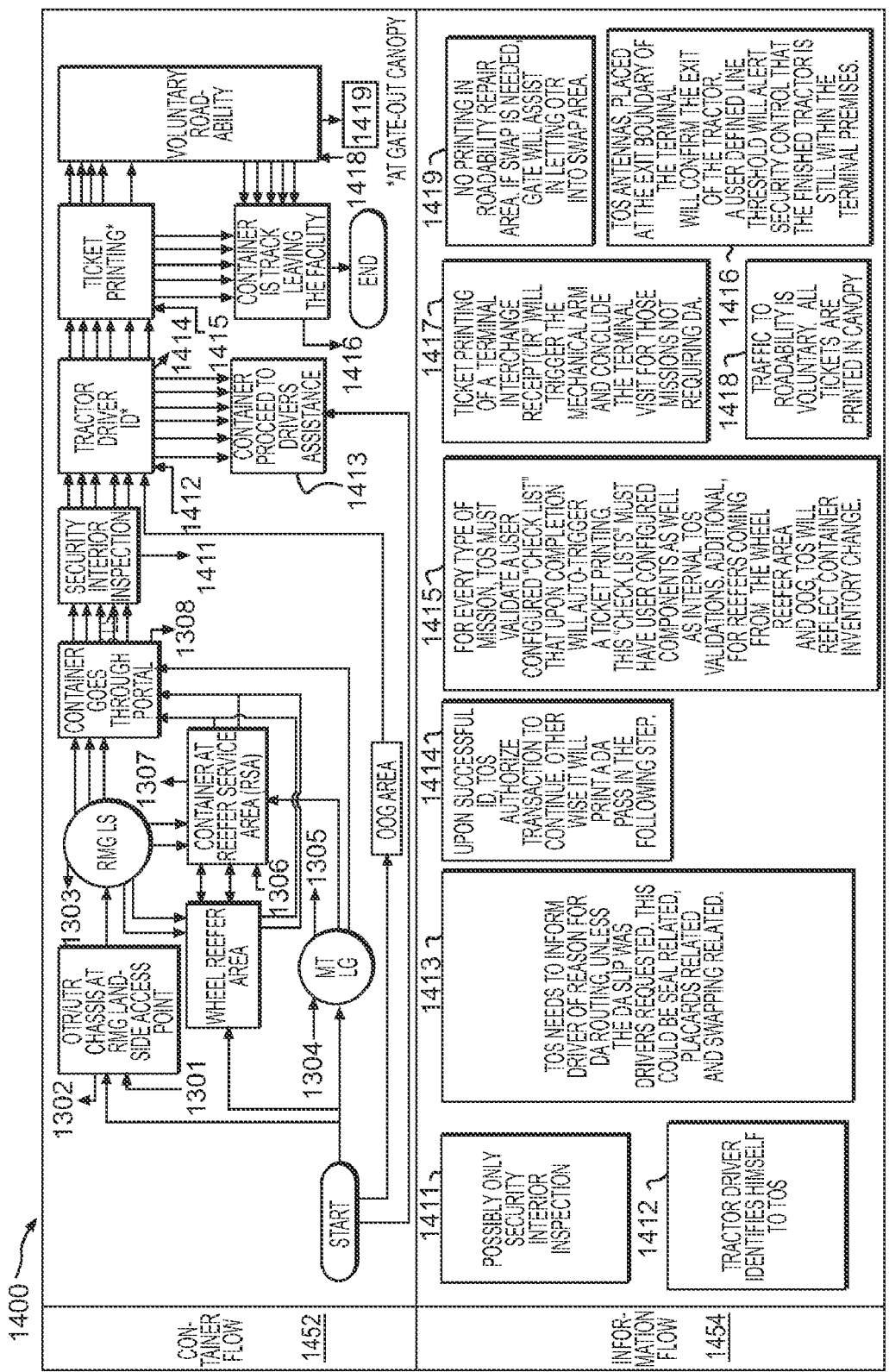
FIG. 14 is a flowchart similar to FIG. 13 that highlights additional features and processes.

FIG. 14 is a flowchart 1400 further illustrating an exemplary container flow 1452 and an information flow 1454 from the yard to an out-gate. The first half of the process was previously described with respect to FIG. 13. Thus, FIG. 14 highlights the out-gate process beginning at the interior security inspection at 1411. In one embodiment, only a remote interior inspection is performed, although manual inspections may also be performed if needed.

Prior to exiting, the OTR driver may identify at 1412 himself/herself to the TOS using biometrics or other identification recognition technology. If the driver is to be routed at 1413 to the driver's assistance area, and the stop was not requested by the driver, he/she must be notified of the routing by the TOS. Further, the Driver's assistance area should be equipped to communicate with the gate control and equipped with printing capabilities so that a final ticket intercharge receipt (TIR) may be issued.

Upon successful identification of the driver at 1414, the TOS may authorize the out-process to continue. Otherwise, the TOS will issue a driver's assistance pass.

If the process continues, the TOS will validate at 1415 a user-configured checklist. In one embodiment, completion of the validation process will automatically trigger ticket issuance. If an outbound reefer picked up from the wheel reefer area or out of gauge area is involved, the TOS will reflect the change in inventory.

Ticket printing at 1417 of a terminal intercharge receipt (TIR) may raise a mechanical arm and conclude the terminal visit for missions that do not require a visit to driver's assistance. TOS antennas at 1416, placed proximate the exit boundary of the terminal will confirm the exit of the tractor/container. Optionally, a user-defined time threshold may be use to alert terminal security forces if a finished tractor/container remains within the terminal premises.

In one embodiment, traffic is routed to the roadability inspection station at 1418 on a voluntary basis. If the inspection is passed, the TIR may be printed at a printer terminal located within the inspection station canopy or a maintenance/repair terminal. If the inspection is not passed 1419, no TIR will be printed. Instead, a swap may be arranged, or the OTR may be routed to a maintenance and repair area.

Figure 15:
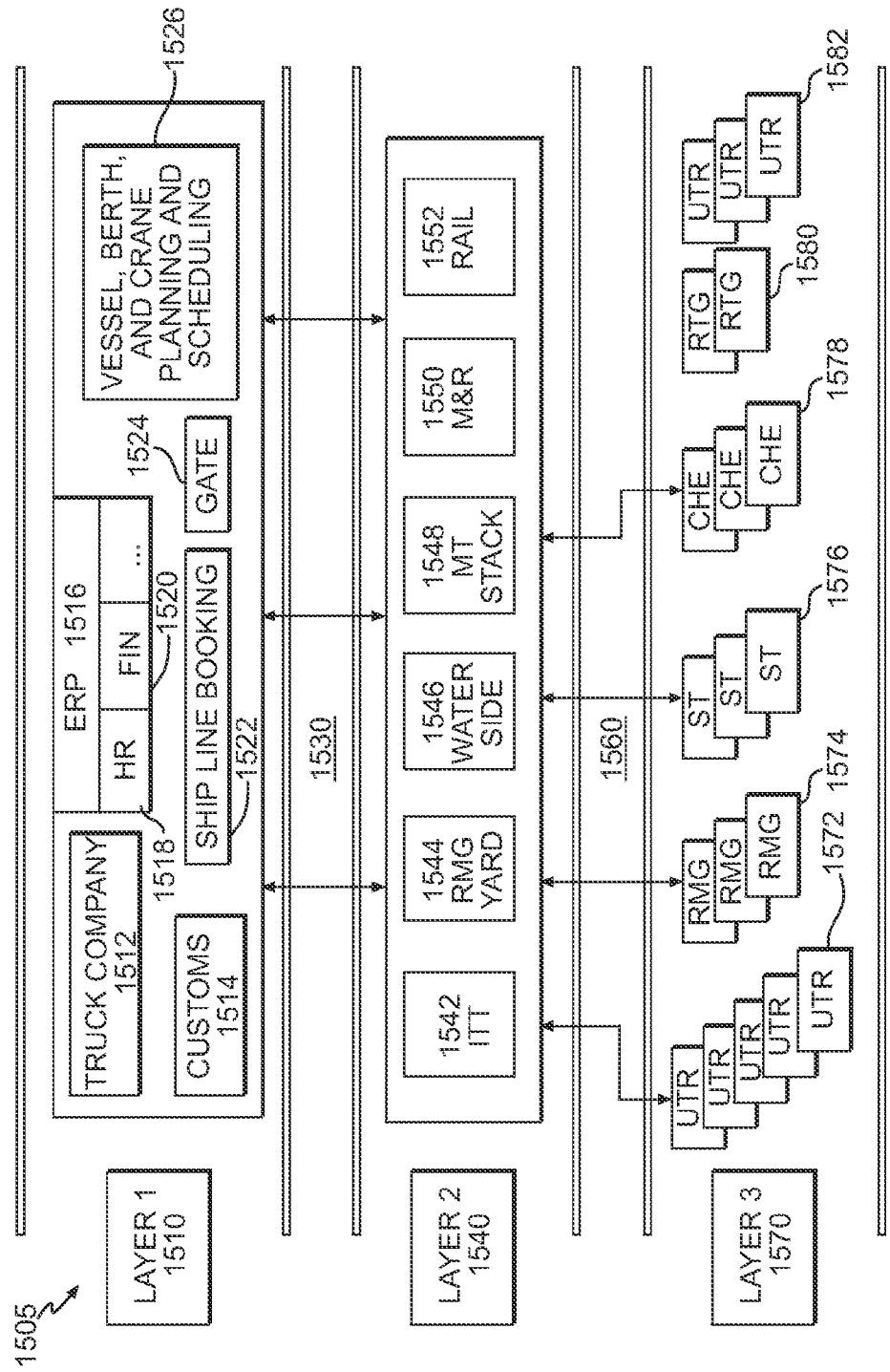
FIG. 15 is a high-level diagram of a three-tiered software program that may be used in the container handling facility of claim 1.

FIG. 15 is a high-level diagram of a three-tiered software program known as a Terminal Operation System (TOS), which may used in the container handling facility of claim 1. The TOS 1505 may be used in automated, as well as in conventional terminals. As described above, the TOS 1505 may be software for implementing one or more of the functions described in association with the principles of the disclosure. By way of example only, the TOS 1505 may include software for implementing, controlling and monitoring the shuttle trucks, the RMG, the automated routing at the terminal gate, the regulated access system for the STs and the RMGs, and efficient lane usage by STs. Aspects of these and other functions are described below, which illustrates the TOS 1505 as an overarching software program for facilitating data exchange, and implement, controlling and monitoring the various functions of the terminal according to the principles of the disclosure.

In an automated terminal, this system 1505, which may include three layers 1510, 1540 and 1570, plans and controls all container-related actions that take place on the terminal, based on orders coming from customers and internal requirements. This system may provide that no container is moved on the terminal without this system having initiated the movement. Layer (1) 1510 of system 1505 may contain functionalities related to truck companies 1512, customs 1514, enterprise resource 1516, including human resources 1518 and financial 1520, ship line booking 1522, gate operation 1524, and vessel, berth and crane planning and scheduling 1526. For example, truck company functionalities 1512 and customs functionalities 1514 may include the functions described above related to the automated gate routing at the terminal. Additional functionalities related to inspection, terminal routing slips, rail crane planning and scheduling, work sequences, berth and quay crane planning, vessel planning and work sequences may also be included.

Layer (2) 1540 of system 1505 includes Planning and Scheduling Systems that interacts with Layer (1) 1520 through interface software 1530. The Planning and Scheduling Systems schedules and controls container movements and allocates equipment for each of the functional areas. They optimize the container flow and equipment used on the terminal. No container movement will take place without being optimized and allocated to equipment through the planning and scheduling systems. The systems may include the RMG yard system 1544, the internal terminal transportation system 1542, the empty container stack system 1548, the maintenance and repair system 1550, the rail system 1552, and the waters side transportation system 1546. For example, RMG yard system 1544 and the waterside transportation system 1546 may include the functions described above related to the efficient routing of shuttle trucks, the regulated access system for shuttle trucks and RMGs, and the multiple container access area provided with the RMG.

Layer (3) 1570 includes the systems that plan and control all equipment operations (RMGs, STs, and manned power equipment). Layer (3) interacts with Layer (2) 1540 through interface software 1560. Based on instructions from the Planning and Scheduling layer, specific power equipment is assigned to execute specific movements. Based on feedback from the power equipment, the power equipment control and execution systems will ensure the work order is being executed and communicated to Scheduling and Control system. These systems include the UTR systems 1572, the RMG systems 1574, the shuttle truck systems 1576, the container handling equipment systems 1578 and the interactive RTG systems 1580 and the container truck systems 1582. For example, the container truck systems 1572 may include the functions described above related to the automated gate routing at the terminal. In addition, the RMG systems 1574, the shuttle truck systems 1576 and the container handling systems 1578 may include functions described above related to the efficient routing of shuttle trucks, the regulated access system for shuttle trucks and RMGs, and the multiple container access area provided with the RMG. Other functionalities may also be provided in TOS 1505.

It is envisioned that a container handling facility constructed according to the principles of the disclosure may also include a rail operations area. The rail operations area typically includes a rail yard and a rail buffer area. The rail yard includes train tracks and rail equipment. The rail buffer area is an area within the rail operations area for storing/buffering containers for loading/unloading from railcars. The rail buffer area may include a DGPS system to track the positions of individual containers. Trailer chassis may be pre-stowed within the rail buffer area in anticipation of the arrival of an inbound train. A static scale may be provided at the rail buffer area to weigh inbound or outbound containers.

At least the inbound/outbound railcars may be serviced by one or more rubber tire gantry cranes ("RTGs"). For example, each RTG may span three sets of railroad tracks, and may transfer containers between railcars and container handling intra-facility utility trucks ("UTRs"). The UTRs may transport the containers between the rail yard and rail buffer area, as well as between these areas and the waterside exchange area and/or the landside operations area.

The TOS software system described above may further include a rail operations management software system. The rail operations management system may be configured to receive, store, process, and output information relating to the arrival, departure, and/or storage of containers transported by rail. This and other container handling facility information may be exchanged between the TOS and the rail operations management system. Additionally, the rail operations system may include a user-interface that is accessible over a computer network such as the Internet.

The main entrance to the rail yard may include a security gate and/or an automatic equipment identifier (AEI), which is an electronic reader used to identify railcars and/or their cargoes. For example, the AEI may electronically identify an order of railcars entering or exiting the rail yard.

As much as possible, information regarding the loading/unloading of railcars should be provided to the container handling facility TOS in advance of time the railcars are scheduled to arrive or depart the container handling facility rail yard. By way of illustration, this information could be provided about 96 hours prior to arrival, and updated in about 24 hour increments thereafter. The information regarding the loading/unloading of railcars may include, but is not limited to, a forecast of a ship line's estimate of the quantity, size, and type of empty containers to be transferred to/from the railcars. Additional information may include the quantity, size, and type of loaded containers to be transferred from/to the railcars. Based at least on this information, the TOS may analyze a layout of a train to determine a best starting position for any RTG needed and/or a pre-staging of terminal trailer chassis/UTR's.

A pre-arrival planning phase may occur approximately twelve hours before the start of rail operations. The pre-arrival planning phase may include the following sequential procedures: First, a representative of the container handling facility contacts a ship line to discuss any changes to the inbound/outbound plan, and any changes are agreed upon. Next, final confirmation of the train's arrival is received from the rail operator. Then the TOS will perform an auto-discharge function that creates a list of work orders, all sequenced in accordance with a master work sequence previously generated by the TOS. Additionally, the TOS may produce reports for special containers segregated by type, such as, but not limited to, dangerous cargo containers, reefers, flat racks, etc. These reports may specify specific stow positions for each type of cargo. The discharge plan (i.e., compilation of work orders) is then communicated to the appropriate rail operations personnel. When an inbound train arrives, the AEI reader will capture the rail car numbers and rail car sequence, and communicate this data to the rail operations management system and/or the TOS. Thereafter, a representative of the container handling facility will authorize performance of the discharge, review the pre-stow plan with appropriate rail operations personnel, and confirm (via the TOS), the RTG/UTR work orders. The TOS may then create a report summarizing the estimated finish times for each machine based on the move count and work being performed. The TOS may also factor breakdowns and other problems into the finish time equation to give an accurate estimate of the completion time.

Figure 16:
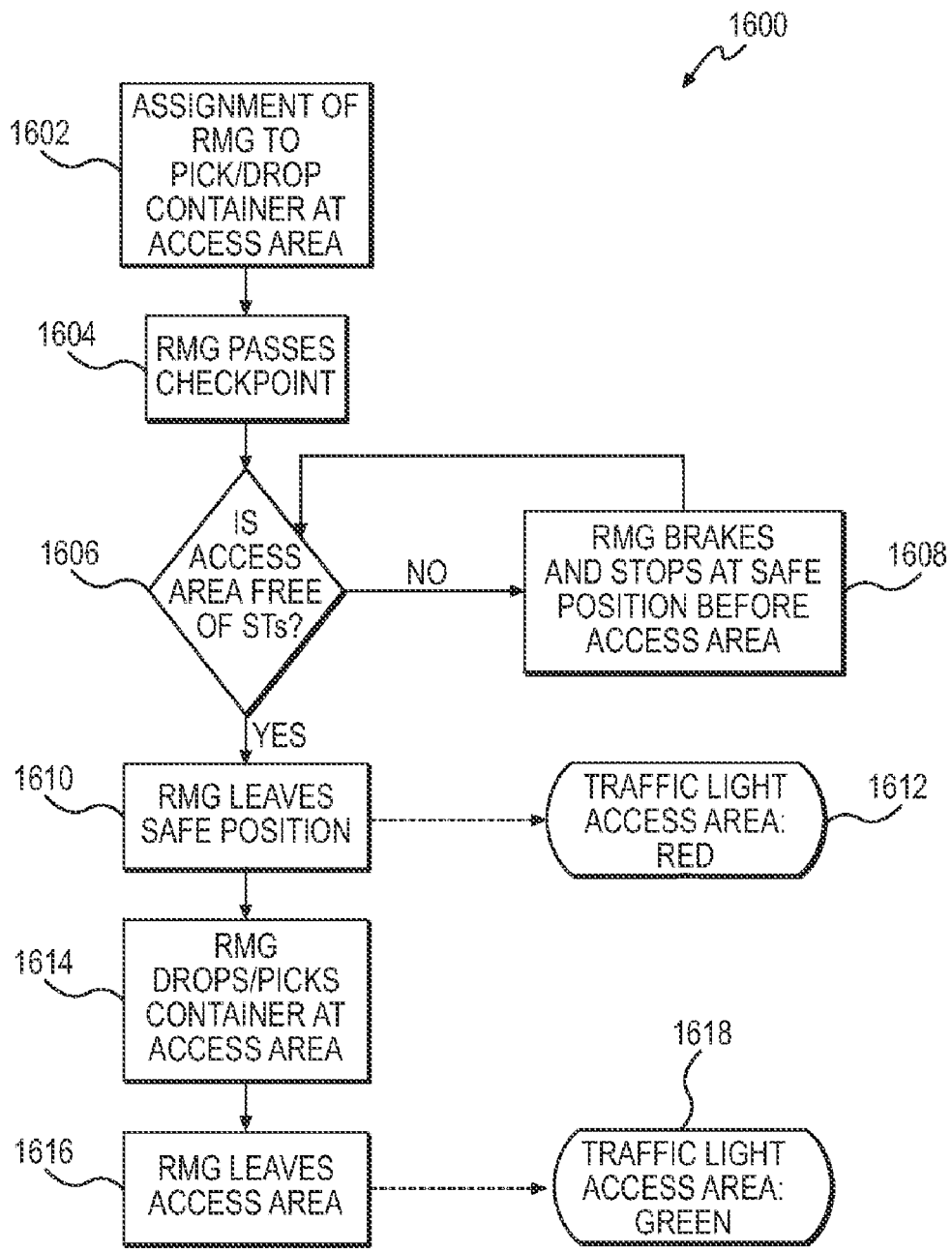
FIG. 16 is a flowchart illustrating another exemplary regulated access process that may be used to operate an automated RMG along a container stack.

FIG. 16 is a flowchart 1600 illustrating another exemplary regulated access process used to operate an automated RMG crane along a container stack. The regulated access process may include assigning a RMG crane to pick/drop a container at a pre-determined (landside or waterside) access area (block 1602). Upon receiving its assignment from the TOS, the RMG crane moves and may pass an optional check point (block 1604). In one embodiment, the checkpoint may be used to activate a collision avoidance system associated with the RMG crane (e.g., an event-triggered laser grid spanning an access area at a pre-determined height). In another embodiment, an always-on collision avoidance system (e.g., continuously operational laser grid spanning an access area at a pre-determined height) may be used, in which case the checkpoint would not be necessary. In any event, the TOS determines whether the access area that the RMG crane will enter is free of shuttle trucks ("STs") (block 1606). If not, the RMG crane brakes and stops at a pre-determined safe position prior to entering the designated access area (block 1608). If the access area is free of ST's, the RMG leaves (or passes by) the safe position (block 1610), at which point the access area traffic light turns red (block 1612) to warn approaching STs that the access area is occupied by the RMG crane. The RMG crane then picks/drops a container at a pre-determined access point within the access area (block 1614). When the RMG leaves the access area (block 1616), the access area traffic light turns green (block 1618) to communicate to approaching STs that the access area is free of the RMG crane.

Figure 17:
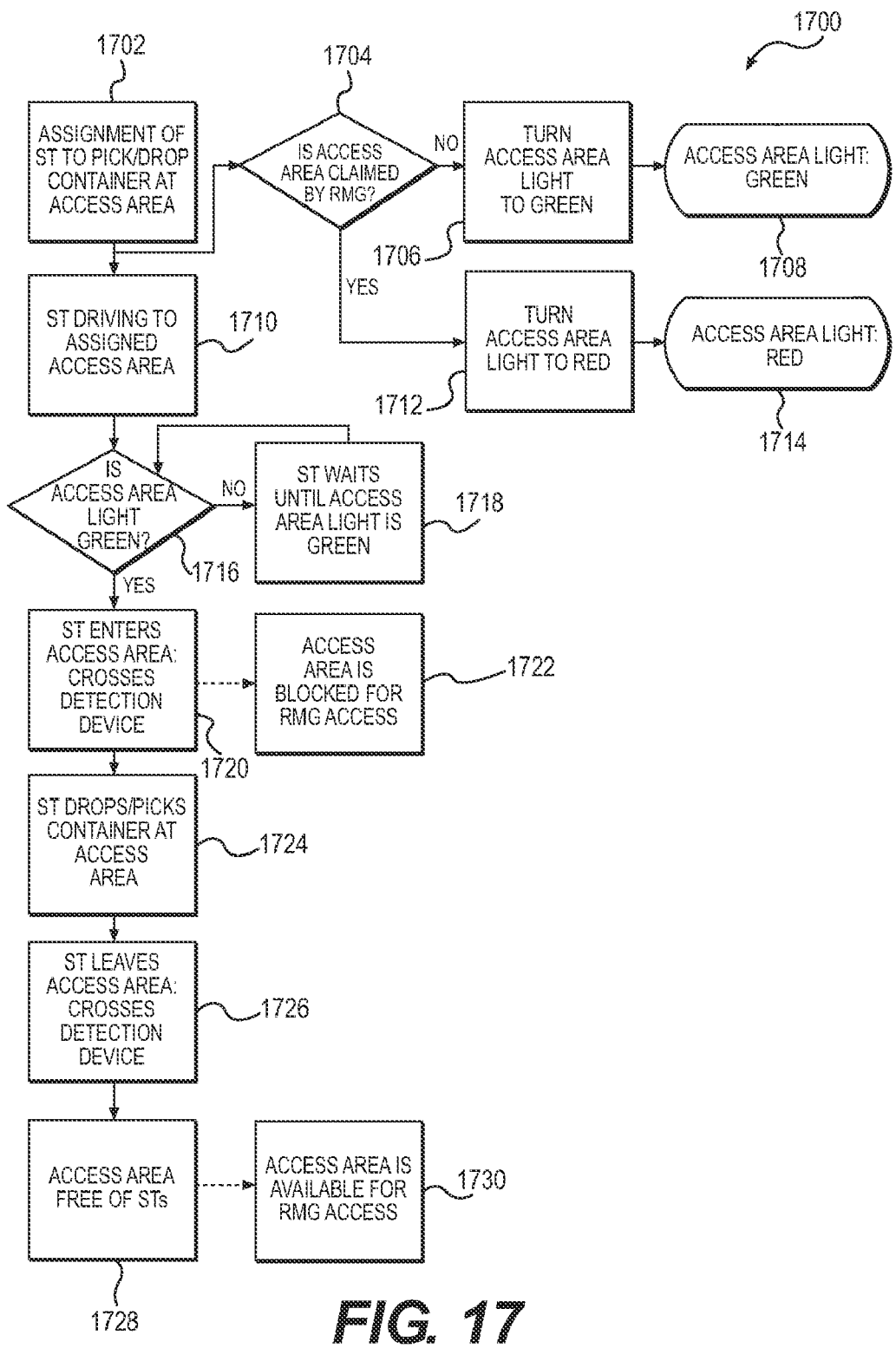
FIG. 17 is a flowchart illustrating another exemplary regulated access process that may be used to operate a non-automated shuttle truck ("ST") between a quayside access point and a waterside access area.

FIG. 17 is a flowchart illustrating another exemplary regulated access process that may be used to operate a non-automated shuttle truck ("ST") between a quayside access point and a waterside access area. To begin the TOS assigns a pre-determined ST to pick/drop a container at an (landside or waterside) access area (block 1702). If the access area is claimed by an RMG crane (block 1704), the access area traffic light turns to red (block 1712) and stays red (block 1714) for as long as the RMG crane occupies the access area. If the access area is not claimed by an RMG crane, the access area traffic light turns to green (block 1706) and remains green (block 1708) until the RMG successfully claims the access area.

Thus, the ST approaches an access area (block 1710) and determines the color of the access area traffic light (block 1716). If red, the ST waits until the access area traffic light turns green (block 1718). If green, the ST enters the access area and in doing so, triggers a detection device (block 1720). The triggering of the detection device blocks the RMG from entering the access area (block 1722) until after the ST leaves the access area.

The ST drops/picks a container at a pre-determined access point within the access area (block 1724), and then leaves the access area, which again triggers the detection device (block 1726) to indicate that the access area is now free of the ST (block 1728) and available for RMG crane access (block 1730).

While the disclosure has been described in terms of exemplary embodiments, those skilled in the art will recognize that the disclosure can be practiced with modifications in the spirit and scope of the appended claims. The examples given above are merely illustrative and are not meant to be an exhaustive list of all possible designs, embodiments, applications or modifications of the disclosure.

What is claimed is:

1. A container handling facility having a landside for receiving vehicles and a waterside for servicing marine vessels and having quay cranes in a quayside area for loading and unloading containers from the marine vessels, the container handling facility comprising:

multiple container stacks, each of the container stacks having first and second distinct and spaced access areas, the first access area being disposed adjacent the waterside to facilitate transfer and buffering of containers between marine vessels and the container stacks, and the second access area being disposed adjacent the landside to facilitate transfer of containers between vehicles and the container stacks;

each of the container stacks having first and second mobile cranes mounted on a common track to move containers in and out of the container stack, under normal operating conditions the first mobile crane servicing the first waterside access area and the second mobile crane servicing the second landside access area of its respective container stack;

a plurality of intra-facility vehicles configured to lift and transport containers along variable routes between the quayside area and the first waterside access areas of the container stacks; and an electronic intra-facility vehicle identification system configured to identify an intra-facility vehicle to receive at least one container at one of the first waterside access areas, the intra-facility vehicle identification system comprising:

at least one first stop mechanism configured to stop movement of each intra-facility vehicle based on its location relative to one of the mobile cranes;

a wireless sensing system associated with at least one of the mobile cranes and configured to detect a presence of at least one intra-facility vehicle within at least one waterside access area; and a second stop mechanism associated with each of the first mobile cranes and configured to stop movement of each of the first mobile cranes in response to a signal from the wireless sensing system indicating the presence of at least one intra-facility vehicle within the at least one waterside access area.

2. The container handling facility of claim 1, wherein the mobile cranes and the common tracks are configured to allow either of the first and second cranes to service either of the first and second access areas.

3. The container handling facility of claim 2, wherein one of the first and second cranes may be parked at either end of the common track remote from the container stacks while the other of the first and second cranes services the stack via first or second access area.

4. The container handling facility of claim 1, further including a plurality of landside intra-facility vehicles configured to lift and transport containers along variable routes between the service areas and the landside access areas of the container stacks, wherein the electronic intra-facility vehicle identification system identifies at least one of the plurality of landside intra-facility vehicles to receive at least one container at one of the second landside access areas.

5. The container handling facility of claim 1, further comprising an electronic terminal operating system configured to track information characteristic of a container and/or its contents and to schedule movement of a container to or from the first and second access areas.

6. The container handling facility of claim 5, wherein the electronic terminal operating system is further configured to schedule movement of a container to or from the quayside area, landside, and/or a rail operations area.

7. The container handling facility of claim 6, wherein the electronic terminal operating system is further configured to schedule buffering of one or more containers at least one of the first access areas, the second access areas, the multiple container stacks, and the quayside area.

8. The container handling facility of claim 5, wherein the mobile cranes are configured to automatically shuffle containers within a container stack in response to instructions received from the terminal operating system.

9. The container handling facility of claim 1, wherein the first access areas include a plurality of vehicle lanes, with adjacent lanes sharing a common wheelpath.

10. The container handling facility of claim 1, further comprising a navigational system to track the plurality of intra-facility vehicles.

11. The container handling facility of claim 1, wherein the intra-facility vehicles are motorized vehicles capable of carrying multiple containers at once.

12. The container handling facility of claim 1, wherein the wireless information sensing system comprises a laser.

13. The container handling facility of claim 1, wherein the electronic intra-facility vehicle identification system further comprises at least one traffic control device to control movements of the intra-facility vehicles based on spatial position information about the intra-facility vehicles sensed by the wireless sensing system.

14. The container handling facility of claim 1, further comprising a stop mechanism associated with each of the second mobile cranes and configured to prevent movement of each of the second mobile cranes into each of the second access areas until a signal indicative of a safe location of a vehicle driver is received.

15. The container handling facility of claim 1, wherein each of the mobile cranes includes a spreader and is configured to carry the spreader at a pre-determined safety height when entering the first and second access areas.

16. The container handling facility of claim 1, wherein each of the mobile cranes is further configured to automatically transfer operational control to the electronic operator interface prior to lowering the spreader to lift a container from one of the access areas.

17. The container handling facility of claim 16, wherein each of the mobile cranes is further configured to automatically deliver a lifted container to a predetermined storage location after the spreader and lifted container are at the predetermined safety height and the electronic operator interface has released operational control.

18. The container handling facility of claim 1, further comprising:

an automated entry gate; and an electronic terminal operating system to receive and track information characteristic of a container and/or its contents and to schedule movement of a container from the automated entry gate to at least one of the second access areas.

19. The container handling facility of claim 18, wherein the automated entry gate comprises:

a vehicle identification system coupled with the electronic terminal operating system to receive the characteristic information and transmit it to at least the electronic terminal operating system; and a message system coupled with the electronic terminal operating system to convey operating instructions to drivers of over-the-road vehicles entering the container handling facility.

20. The container handling facility of claim 19, wherein the operating instructions are based at least on the characteristic information.

21. The container handling facility of claim 19, wherein the vehicle identification system including a wireless receiver, a high resolution camera, a static scale, and an optical character recognition reader.

22. The container handling facility of claim 1, wherein the waterside access area includes multiple lanes extending generally in a longitudinal direction from the container stacks, each lane including two longitudinally spaced access points where containers may be grounded.

23. The container handling facility of claim 1, further comprising an electronic operator interface to control at least one of the mobile cranes, the operator interface being disposed remote from the at least one controlled mobile cranes.

* * * * *